United States Patent
Yamaguchi et al.

(10) Patent No.: US 9,738,141 B2
(45) Date of Patent: *Aug. 22, 2017

(54) VEHICLE

(71) Applicant: HONDA MOTOR CO., LTD., Tokyo (JP)

(72) Inventors: Tomoki Yamaguchi, Wako (JP); Hitoshi Hakamada, Wako (JP); Seiji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/782,687

(22) PCT Filed: Apr. 22, 2014

(86) PCT No.: PCT/JP2014/061226
§ 371 (c)(1),
(2) Date: Oct. 6, 2015

(87) PCT Pub. No.: WO2014/175240
PCT Pub. Date: Oct. 30, 2014

(65) Prior Publication Data
US 2016/0046177 A1   Feb. 18, 2016

(30) Foreign Application Priority Data

Apr. 23, 2013 (JP) .................................. 2013-090576

(51) Int. Cl.
*B60J 5/10* (2006.01)
*B60N 2/01* (2006.01)
(Continued)

(52) U.S. Cl.
CPC ............... *B60J 5/101* (2013.01); *B60J 5/102* (2013.01); *B60J 5/105* (2013.01); *B60N 2/065* (2013.01);
(Continued)

(58) Field of Classification Search
CPC .. B60J 5/10–5/108; B60N 2/01; B60N 2/065; B60N 2/3006
(Continued)

(56) References Cited

U.S. PATENT DOCUMENTS

| | | | |
|---|---|---|---|
| 3,193,321 A | * | 7/1965 | Rose ...................... B60F 3/0069 280/414.1 |
| 5,083,833 A | | 1/1992 | Herrmeyer |

(Continued)

FOREIGN PATENT DOCUMENTS

| | | |
|---|---|---|
| DE | 1288929 B | 2/1969 |
| DE | 102007056853 A1 | 5/2009 |

(Continued)

OTHER PUBLICATIONS

Notification of Transmittal of Translation of the International Preliminary Report on Patentability (Form PCT/IB1338) issued in counterpart International Application No. PCT/JP2014/061226 mailed Nov. 5, 2015 with Forms PCT/IB/373 and PCT/ISA/237. (8 pages).

(Continued)

*Primary Examiner* — Gregory Blankenship
(74) *Attorney, Agent, or Firm* — Westerman, Hattori, Daniels & Adrian, LLP

(57) ABSTRACT

In this vehicle, a rear opening is formed across the entire rear surface of the vehicle body in the vehicle width direction, a tailgate capable of opening and closing the rear opening is attached to the vehicle body so as to be capable of swinging up and down, a passenger opening is formed that allows (Continued)

passengers to enter and exit through the tailgate, and a seat is provided adjacently to the rear surface. The passenger opening is formed in a portion of the rear surface in the vehicle width direction. One end of the seat in the vehicle width direction is positioned on one end of the vehicle body in the vehicle width direction, and the other end of the seat in the vehicle width direction is positioned in a portion overlapping with the passenger opening in the vehicle width direction.

11 Claims, 19 Drawing Sheets

(51) Int. Cl.
    *B60N 2/06*     (2006.01)
    *B60N 2/30*     (2006.01)

(52) U.S. Cl.
    CPC .......... *B60N 2/3006* (2013.01); *B60N 2/3011* (2013.01); *B60N 2/3043* (2013.01); *B60N 2/3047* (2013.01); *B60N 2/01* (2013.01)

(58) Field of Classification Search
    USPC .......................... 296/146.8, 50, 51, 56, 57.1
    See application file for complete search history.

(56) References Cited

U.S. PATENT DOCUMENTS

| | | | | |
|---|---|---|---|---|
| 5,524,954 | A * | 6/1996 | Gold | B60J 5/103 296/106 |
| 5,876,086 | A | 3/1999 | Lagrou et al. | |
| 6,513,863 | B1 * | 2/2003 | Renke | B60J 5/108 296/190.11 |
| 6,607,231 | B2 * | 8/2003 | Paiva | B60J 1/1884 296/146.8 |
| 6,796,600 | B1 * | 9/2004 | Ferer | B60J 1/2011 296/146.1 |
| 6,837,529 | B2 * | 1/2005 | Kharod | B60J 1/1853 296/146.4 |
| 9,505,291 | B2 * | 11/2016 | Yamaguchi | B60J 5/105 |
| 2003/0122396 | A1 * | 7/2003 | Humphrey | B62D 33/0273 296/51 |
| 2004/0174035 | A1 * | 9/2004 | Acker | B62D 33/0273 296/57.1 |
| 2007/0024083 | A1 * | 2/2007 | Ryman | B60J 5/108 296/146.1 |
| 2007/0046060 | A1 * | 3/2007 | Werner | B60J 1/1884 296/51 |
| 2007/0158973 | A1 * | 7/2007 | Kolbl | B60J 5/12 296/146.8 |
| 2007/0222258 | A1 * | 9/2007 | Bacco | B60J 9/02 296/182.1 |
| 2009/0096252 | A1 * | 4/2009 | Gordon | B60J 10/80 296/190.11 |
| 2010/0253043 | A1 * | 10/2010 | Gast | B60J 5/108 280/423.1 |
| 2010/0314903 | A1 * | 12/2010 | Voyer | B60J 5/104 296/146.8 |
| 2012/0126564 | A1 * | 5/2012 | Hausler | B62D 33/0273 296/62 |
| 2012/0326466 | A1 | 12/2012 | Kileen | |
| 2013/0200648 | A1 | 8/2013 | Farcas | |
| 2015/0183307 | A1 * | 7/2015 | Hakamada | B60J 5/101 296/146.9 |
| 2016/0039273 | A1 * | 2/2016 | Yamaguchi | B60J 5/105 296/146.8 |
| 2016/0046177 | A1 * | 2/2016 | Yamaguchi | B60J 5/101 296/146.8 |
| 2016/0075286 | A1 * | 3/2016 | Butlin, Jr. | B60R 3/02 296/62 |
| 2016/0101764 | A1 * | 4/2016 | Matsuura | B60S 1/583 296/146.2 |
| 2016/0114661 | A1 * | 4/2016 | Yamaguchi | B60J 1/18 296/146.2 |
| 2016/0114662 | A1 * | 4/2016 | Yamaguchi | B60J 5/103 296/146.8 |
| 2016/0114768 | A1 * | 4/2016 | Matsuura | B60S 1/583 296/146.2 |

FOREIGN PATENT DOCUMENTS

| | | |
|---|---|---|
| DE | 10 2008 020 090 A1 | 10/2009 |
| DE | 102008018333 A1 | 10/2009 |
| EP | 1 764 247 A2 | 3/2007 |
| EP | 2 386 435 A1 | 11/2011 |
| JP | 61-68935 U | 5/1986 |
| JP | 63-173736 A | 7/1988 |
| JP | 05-4519 A | 1/1993 |
| JP | H08142680 A | 6/1996 |
| JP | 2514650 Y2 | 10/1996 |
| JP | 3317165 B2 | 8/2002 |
| JP | 2004/299641 A | 10/2004 |
| JP | 2005053315 A | 3/2005 |
| JP | 2014012445 A | 1/2014 |
| JP | 2014012448 A | 1/2014 |
| WO | 2011125171 A1 | 10/2011 |

OTHER PUBLICATIONS

International Search Report dated Jul. 22, 2014, issued in counterpart Application No. PCT/JP2014/061226 (2 pages).
Japanese Office Action dated Jan. 6, 2017, issued in Japanese Patent Application No. 2015-513761, with partial English translation (25 pages).
Extended (supplementary) European Search Report dated Mar. 31, 2017, issued in counterpart European Application No. 14788260.9. (8 pages).

* cited by examiner

FIG.4
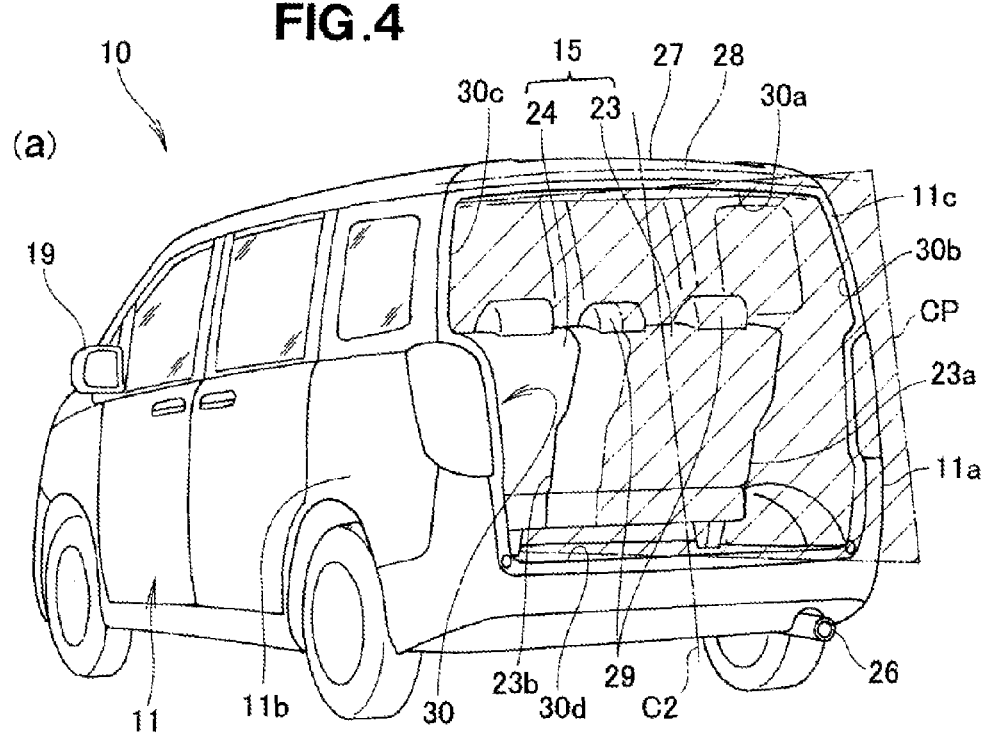
(a)
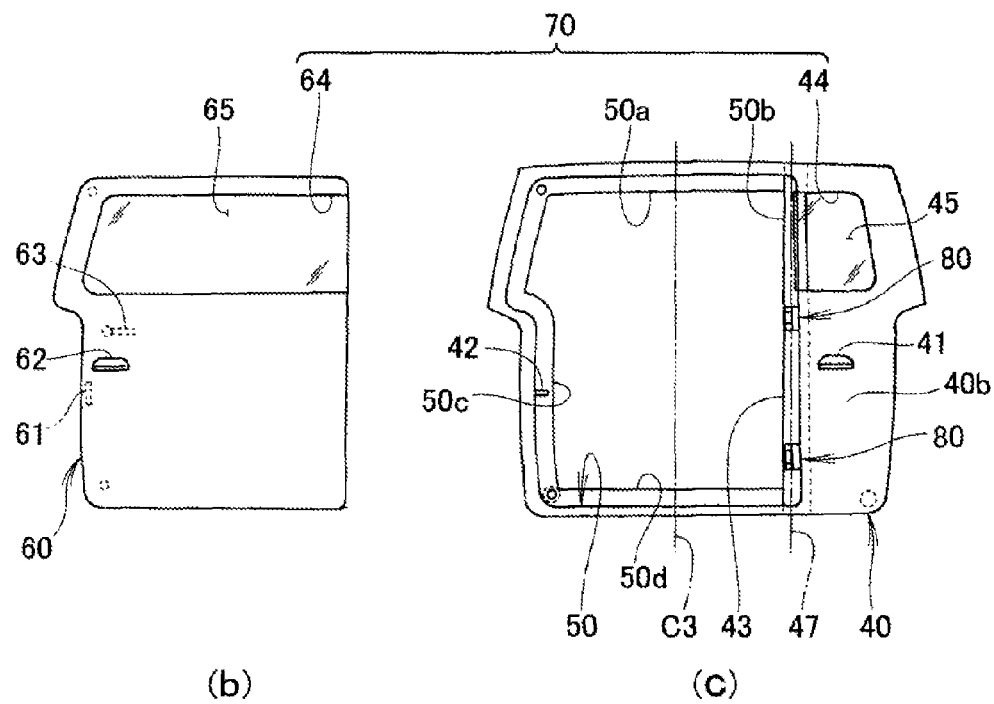
(b)     (c)

FIG. 9
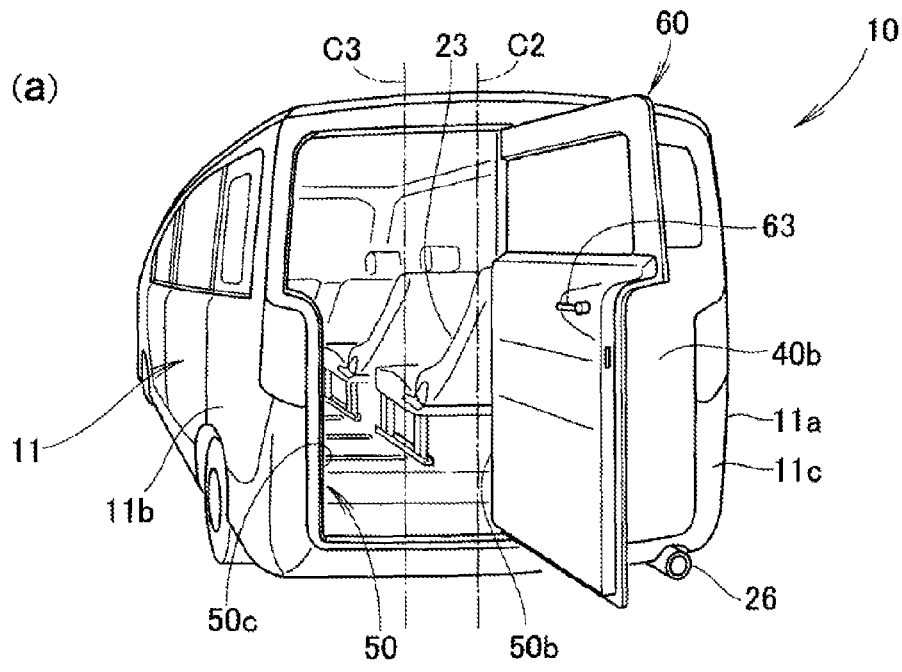
(a)
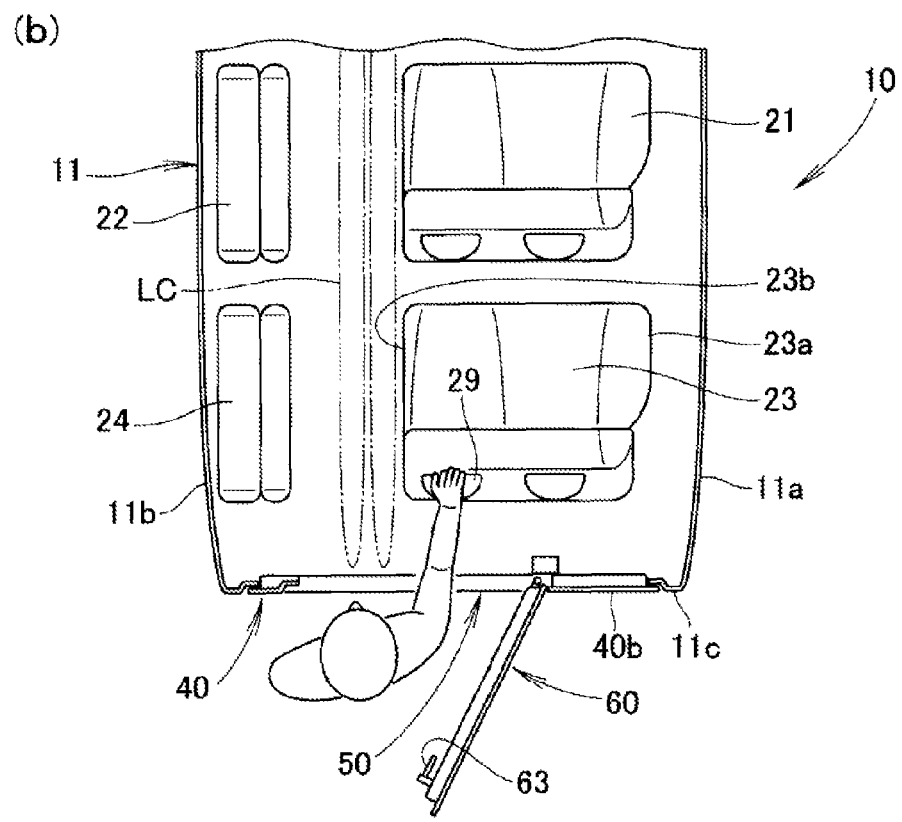
(b)

(a) COMPARATIVE EXAMPLE (b) INVENTIVE EXAMPLE (c) INVENTIVE EXAMPLE (d) INVENTIVE EXAMPLE

FIG.11
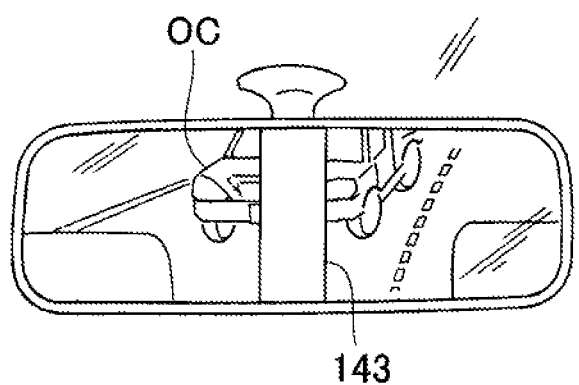
(a)
COMPARATIVE EXAMPLE
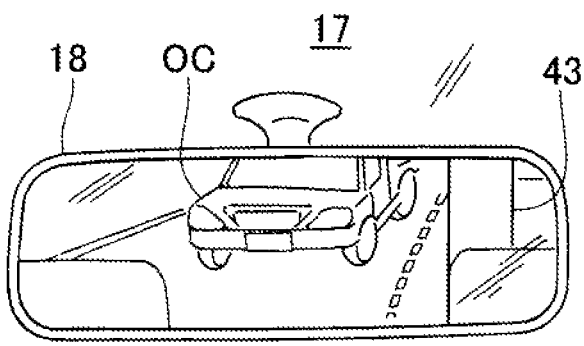
(b)
INVENTIVE EXAMPLE

FIG.13
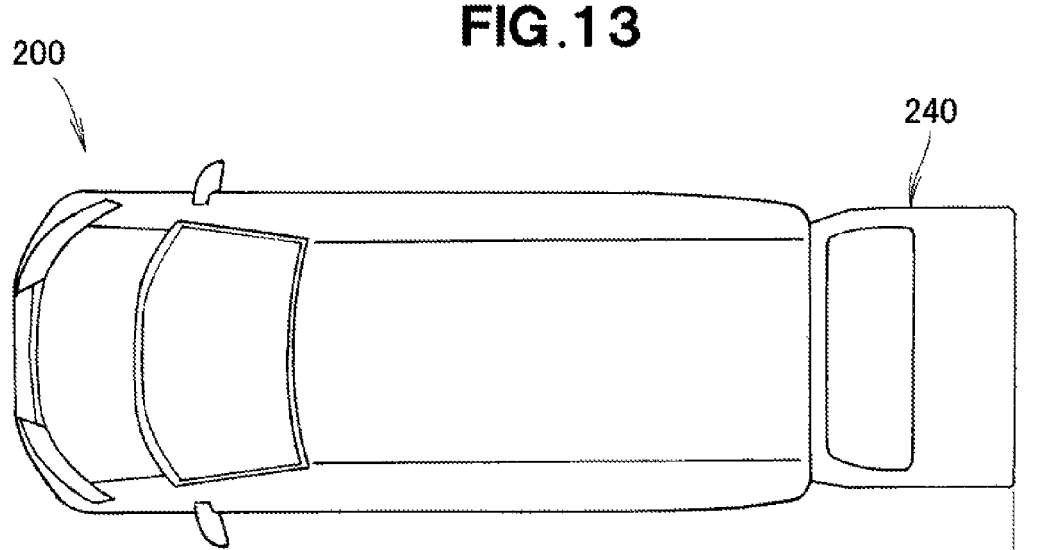
(a)
COMPARATIVE EXAMPLE
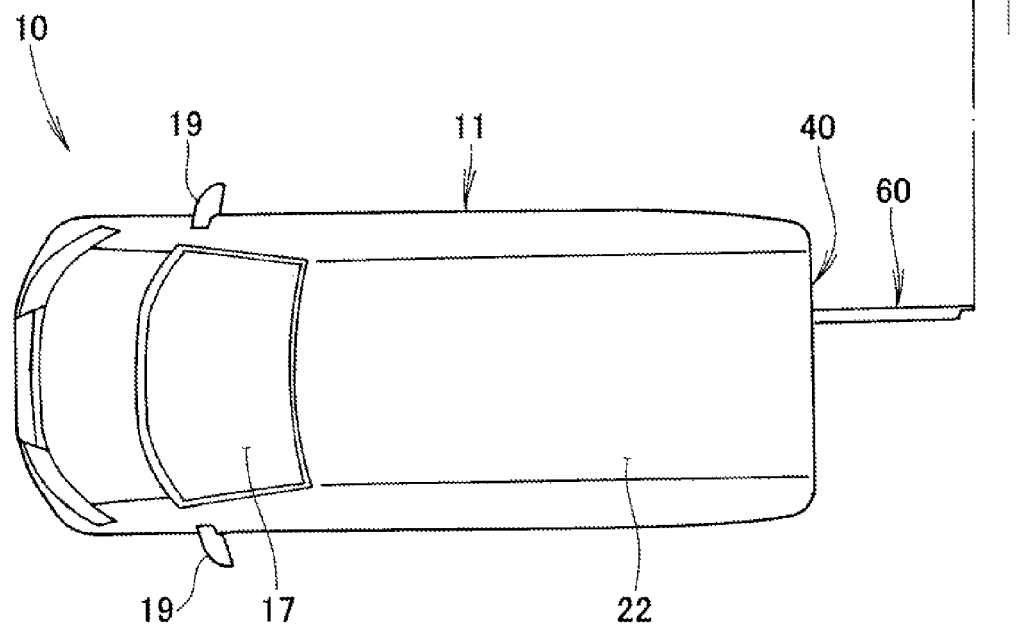
(b)
INVENTIVE EXAMPLE

FIG.14
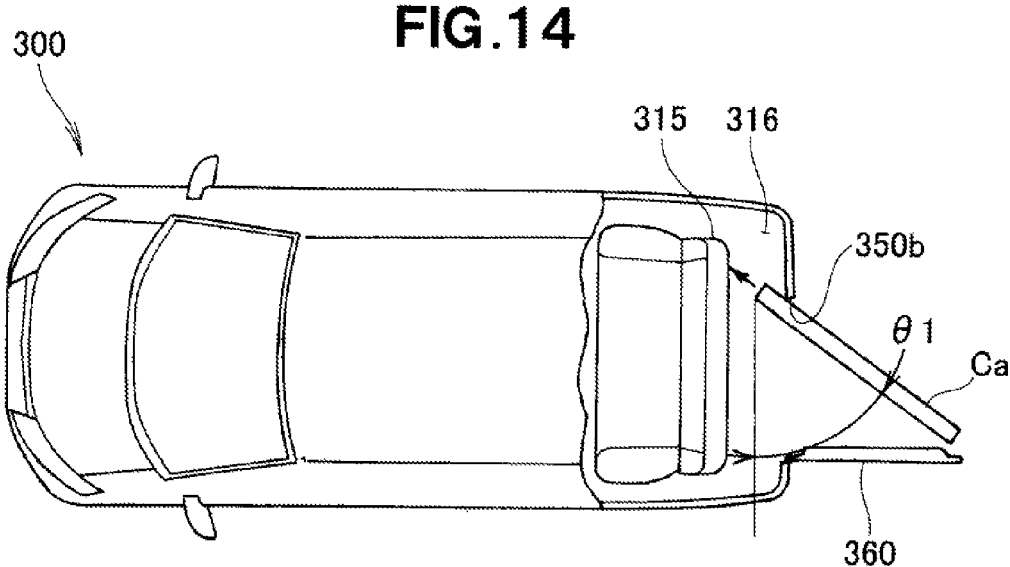
(a)
COMPARATIVE EXAMPLE
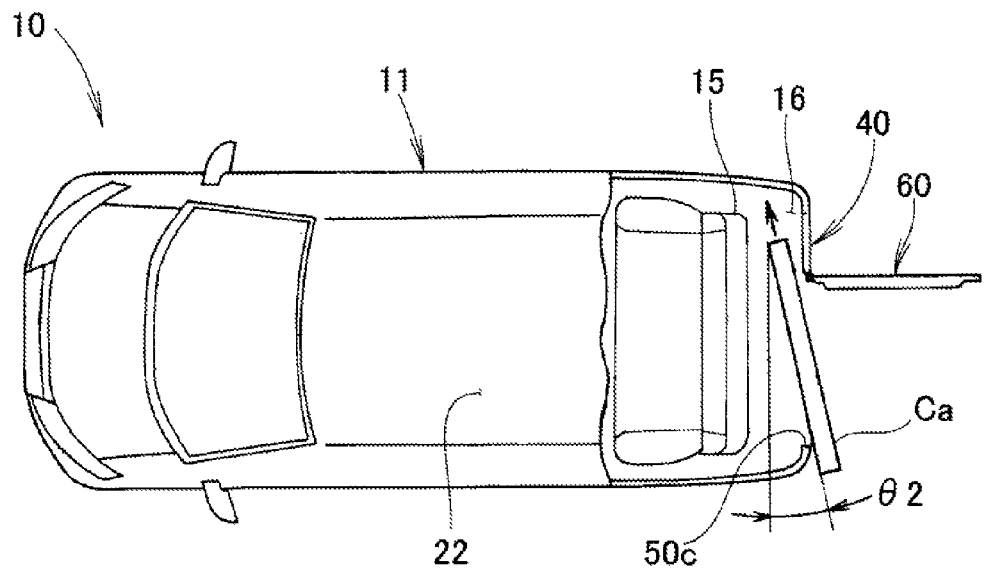
(b)
INVENTIVE EXAMPLE

FIG.15
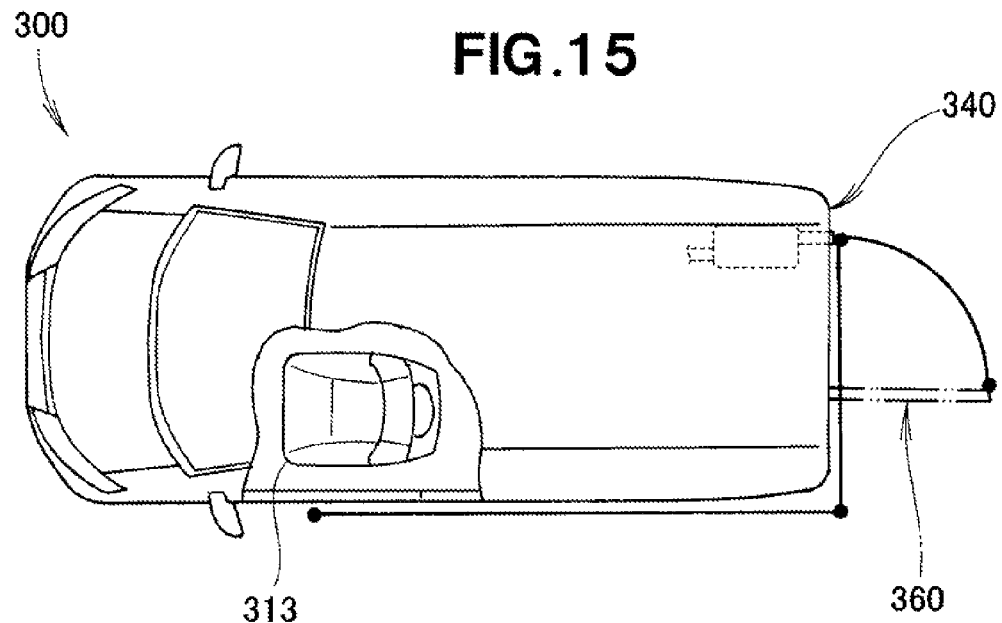
(a)
COMPARATIVE EXAMPLE
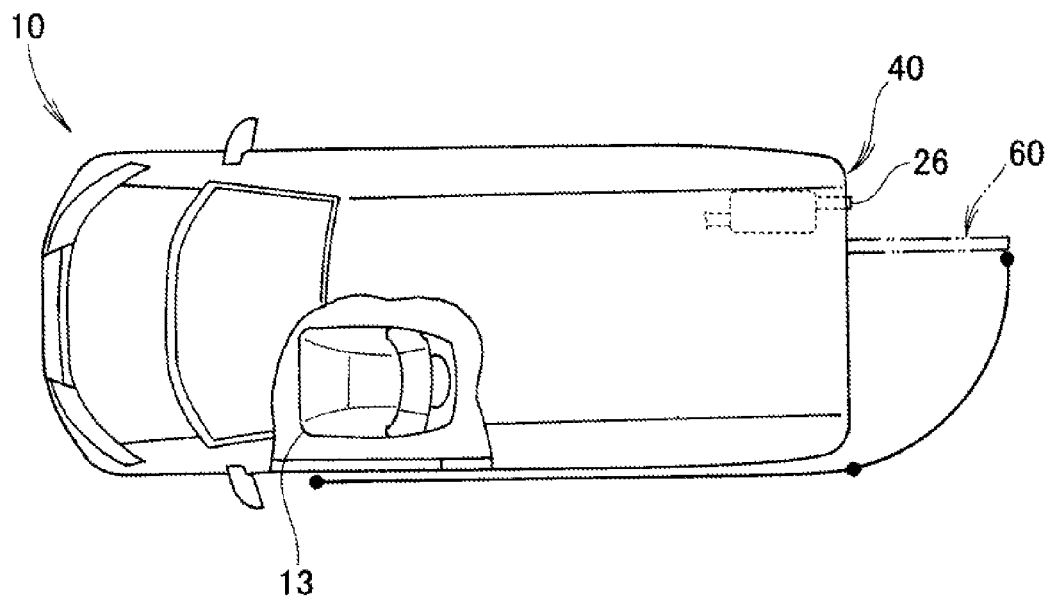
(b)
INVENTIVE EXAMPLE

VEHICLE

TECHNICAL FIELD

The present invent elates to a vehicle in which a tailgate is attached to a vehicle body.

BACKGROUND ART

Vehicles are known in which a rear opening is formed in a rear face of the vehicle, and a tailgate capable of opening and closing the rear opening is provided. The tailgate is swingably attached to the vehicle body. The technique disclosed in Patent Literature 1 below, for example, is known as an example of such a vehicle.

The vehicle disclosed in Patent. Literature 1 includes a rear opening formed in a rear face, a tailgate capable of swinging up and down for opening and closing the rear opening, a secondary opening formed in the tailgate, and two secondary doors for opening and closing the secondary opening.

The two secondary doors are both "double doors" that open laterally outward from a lateral center. Specifically, the two secondary doors are supported together by the tailgate via a linking mechanism, and open outward from the lateral center so as to separate from each other.

For example, such a tailgate having secondary doors may be applied to a tall vehicle. In this case, opening the secondary doors enables a vehicle occupant to enter or exit the vehicle. In such a case, it is preferred that the vehicle occupant be able to easily enter and exit the vehicle.

PRIOR ART LITERATURE

Patent Literature 1: Japanese Registered Utility Model Publication No. 2514650

SUMMARY OF INVENTION

Technical Problem

The present invention addresses the problem of providing a technique whereby a vehicle occupant can easily enter and exit a vehicle.

Solution to Problem

In one aspect of the present invention, there is provided a vehicle in which: a rear opening is formed across an entire rear face in a lateral direction; a tailgate capable of opening and closing the rear opening is attached to a vehicle body; a passenger opening whereby a vehicle occupant can enter and exit is formed in the tailgate; and a seat is provided adjacent to the rear face, characterized in that the passenger opening is formed in a portion of the rear face in the lateral direction, one end in the lateral direction of the seat is positioned at one end in the lateral direction of the vehicle body, and another end in the lateral direction of the seat is positioned at a location overlapping with the passenger opening in the lateral direction.

In another aspect of the present invention, there is provided a vehicle in which a passenger opening is formed in a rear face, and a seat is provided adjacent to the rear face, characterized in that the passenger opening is formed in a portion of the rear face in the lateral direction, a remnant part of the rear face is formed in a location of the rear face excluding the passenger opening, at least a portion of the seat overlaps with the remnant part in the lateral direction, one end in the lateral direction of the seat is positioned at one end in the lateral direction of the vehicle body, and another end in the lateral direction of the seat is positioned at a location overlapping with the passenger opening in the lateral direction.

Preferably, the other end in the lateral direction of the seat is positioned closer than a lateral center line of the passenger opening to the one end in the lateral direction of the vehicle body.

Preferably, a headrest is provided to a top part of the seat, and the headrest overlaps with the passenger opening as viewed from a back face of the vehicle body.

Preferably, left and right side edges of the passenger opening are offset in the lateral direction from the lateral center line of the vehicle body.

Preferably, the passenger opening has a door capable of opening and closing, and of the left and right side edges of the passenger opening, the side edge at the other end in the lateral direction of the vehicle body is a beginning end at which opening by the door begins.

Preferably, a sub-seat is provided extending from the other end in the lateral direction of the seat to the other end in the lateral direction of the vehicle body; and the sub-seat is configured so as to be displaceable to enable passage beside the seat.

Preferably, a seat width of the seat is greater than a seat width of the sub-seat.

Preferably, the sub-seat is displaceable toward the other end in the lateral direction of the vehicle body through use of a folding structure.

Preferably, a front seat is provided in front of the seat and a front sub-seat is provided in front of the sub-seat as viewed from the back face of the vehicle body, and the front sub-seat is configured so as to be displaceable to enable passage beside the front seat.

Advantageous Effects of Invention

In the present invention, the lateral other end of the seat is positioned in a location overlapping with the passenger opening in the lateral direction. This configuration makes it possible for a vehicle occupant entering or exiting from the passenger opening to grip the seat while entering or exiting, and therefore ensures high accessibility.

Furthermore, the lateral other end of the seat is positioned closer than the lateral center line of the passenger opening to the lateral one end of the vehicle body.

Specifically, the length over which the seat overlaps with the passenger opening is less than half the width of the passenger opening. Reducing the amount of overlap of the seat makes it possible to ensure a wide passage for vehicle occupants. Accessibility to vehicle occupants is thereby further increased.

Furthermore, in the present invention, the headrest overlaps with the passenger opening. Accessibility for tall vehicle occupants can be increased and accessibility can be increased, for more vehicle occupants by providing a portion that can be gripped by a vehicle occupant during entry or exiting at a higher position.

Furthermore, in the present invention, left and right side edges of the passenger opening are offset in the lateral direction from the lateral center line of the vehicle body. A driver's seat is usually provided in a location offset from the lateral center line. The lateral center is therefore in a location readily visible to a driver. Forming the passenger opening away from such a location makes it possible to ensure high visibility for the driver.

Furthermore, in the present invention, of the left and right, side edges of the passenger opening, the side edge at the other end in the lateral direction of the vehicle body is a beginning end at which opening by the door begins. Specifically, the door begins to open from the side edge on a side farther from the seat. This configuration makes it possible for a vehicle occupant to enter and exit the vehicle even when the door is open a small amount. Conversely, when the beginning end is the side edge on a side closer to the seat., the door must be opened to a greater degree to prevent the seat from obstructing entry and exiting. The door is therefore configured so as to begin to open from the side edge on the side farther from the seat, thereby ensuring high accessibility to vehicle occupants.

Furthermore, in the present invention, the sub-seat positioned beside the seat is configured so as to be displaceable to enable passage beside the seat. Adopting such a configuration makes it possible for a large number of vehicle occupants to board despite the vehicle being configured so that vehicle occupants can enter and exit from the rear of the vehicle body.

Furthermore, in the present invention, the seat width of the seat is greater than the seat width of the sub-seat. This configuration makes it possible for a larger number of vehicle occupants to be seated without deploying the sub-seat. When all vehicle occupants can be seated on the seat, there is no need to deploy the retracted sub-seat. Enlarging the seat makes it possible to ensure that a large number of vehicle occupants can be seated on the seat and to save the effort of deploying the sub-seat.

Furthermore, in the present invention, the sub-seat is displaceable toward the other end in the lateral direction of the vehicle body through use of a folding structure. A vehicle occupant can grip the folded sub-seat when entering or exiting. This configuration further enhances accessibility.

Furthermore, in the present invention, the front seat is provided in front of the seat, the front sub-seat is provided in front of the sub-seat, and the front sub-seat is configured so as to be displaceable to enable passage beside the front seat. Adopting. such a configuration makes it possible for a vehicle occupant who is or will be seated in a seat other than the row furthest to the rear to also enter or exit from the passenger opening. A larger number of vehicle occupants can then enter or exit from the passenger opening.

BRIEF DESCRIPTION OF DRAWINGS

FIG. 4 is an exploded perspective view of the vehicle illustrated in FIG. 1;

FIG. 9 is a view of the operation of FIG. 8 in further detail;

FIG. 11 is a view of an operation of a rear-view mirror during travel of the vehicle of FIG. 1;

FIG. 13 is a. view of the door in FIG. 1 in further detail;

FIG. 14 is a view of an operation when a long object is placed in the door of FIG. 1;

FIG. 15 is a view of the operation when opening the door in FIG. 1;

DESCRIPTION OF EMBODIMENTS

Figure 1:
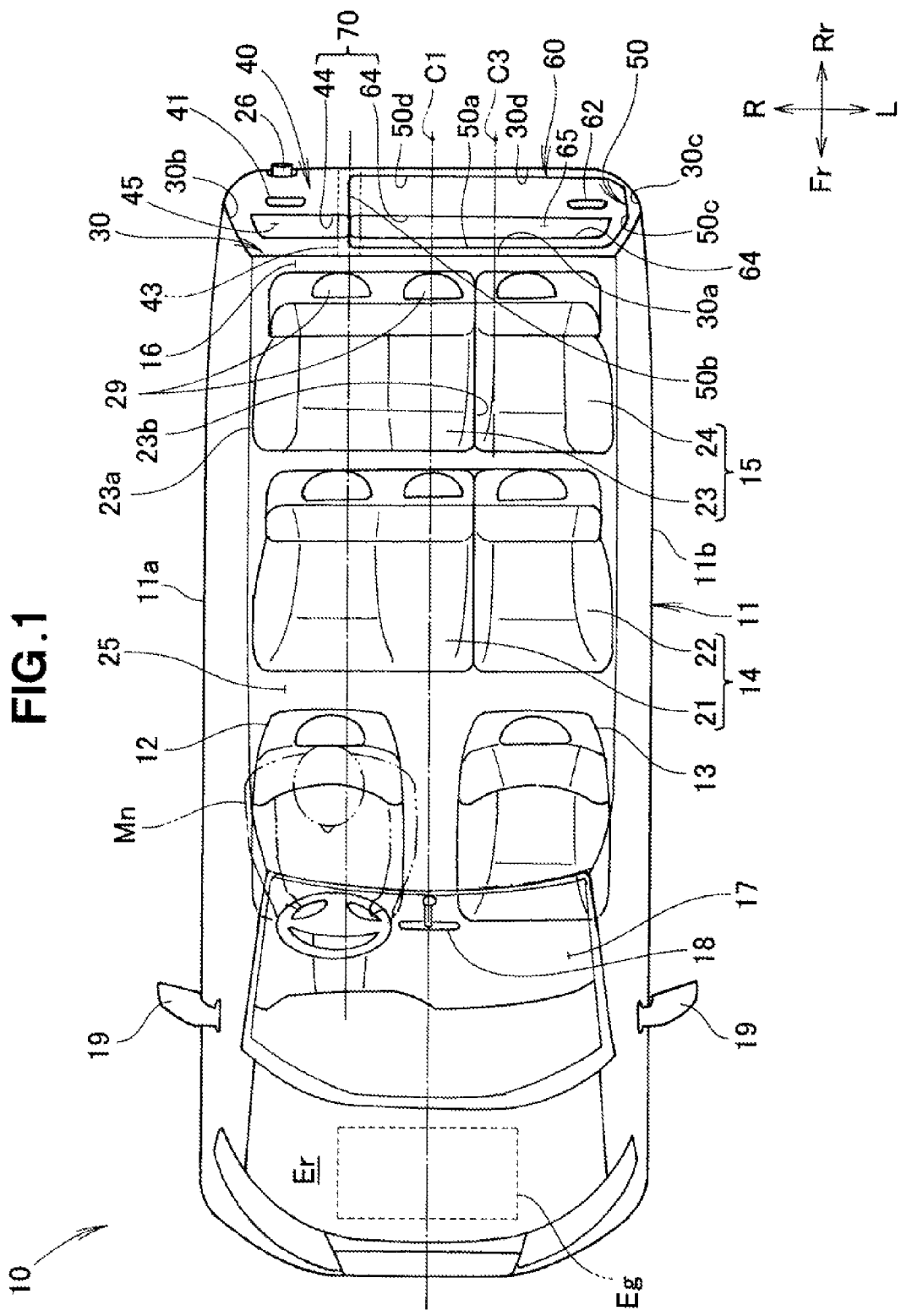
FIG. 1 is a perspective view illustrating a vehicle according to a first embodiment of the present invention, as seen from above.

Embodiments of the present invention are described below with reference to the accompanying drawings. In the description, "left" and "right" are based on the perspective of a vehicle occupant in the vehicle, and "front" and "rear" are based on the direction of travel of the vehicle. In the drawings, "Fr" stands for front, "Rr" for rear," "R" for right, "L" for left, "Up" for top, and "Dw" for bottom.

First Embodiment

The vehicle according to a first embodiment will be described.

The vehicle 10 illustrated in FIG. 1 is an example of a right-hand-drive van. In a passenger compartment 25, three rows of seats are provided from the front to the rear of a vehicle body 11. An engine Eg as a motive power source for travel is mounted in an engine compartment Er in front of the passenger compartment 25. As described in detail below, the motive power source for travel constitutes a portion of a drivetrain for travel.

A driver's seat 12 and a passenger seat 13 are provided as a first row of seats in the passenger compartment 25. The driver's seat 12 and the passenger seat 13 are separately disposed so that a center line C1 extending in a front-rear direction at the center in a lateral direction is interposed therebetween. Specifically, the driver's seat 12 and the passenger seat 13 are offset from the center line C1. In a right-hand-drive vehicle, the driver's seat 12 is provided on the right of the center line C1, and the passenger seat 13 is provided on the left of the center line C1.

A second-row seat 14 and a third-row seat 15 individually extending in the lateral direction and capable of seating three people are provided in a second row and a third row, respectively. The second-row seat 14 is composed of a wide main seat 21 capable of seating two people, and a sub-seat 22 narrower than the main seat 21 and capable of seating one person. Likewise, the third-row seat 15 is composed of a wide main seat 23 capable of seating two people, and a sub-seat 24 narrower than the main seat 23 and capable of seating one person.

The second-row sub-seat 22 is configured so as to be capable of folding toward a left end of the vehicle body 11. The third-row sub-seat 24 is also configured so as to be capable of folding toward the left end of the vehicle body 11.

The mechanism whereby these sub-seats fold may be a publicly known mechanism. The state in which the sub-seat 24 is deployed and a vehicle occupant can sit in the sub-seat 24 as illustrated in the drawings is referred to as the deployed state. The state in which the sub-seat 24 is folded and a vehicle occupant can pass through beside the main seat 23 as described below is referred to as the retracted state.

As appropriate, the second-row main seat 21 is referred to below as the "front seat 21." Likewise, the second-row sub-seat 22 is referred to as the "front sub-seat 22," and the third-row main seat 23 is referred to as the "seat 23."

A cargo compartment 16 for carrying cargo is formed in a rear part of the third-row seat 15. A tailgate 40 for loading and unloading cargo for the cargo compartment 16 is attached so as to be capable of swinging. The cargo compartment 16 constitutes a portion of the passenger compartment 25.

A rear-view mirror 18 for rearward checking by a vehicle occupant Mn is attached to a windshield 17 on the center line C1. Side mirrors 19, 19 for lateral and rearward checking by the vehicle occupant are attached to left and right end parts of a front part of the vehicle body 11.

The vehicle 10 will be described in further detail based on FIGS. 2 through 4.

Figure 2:
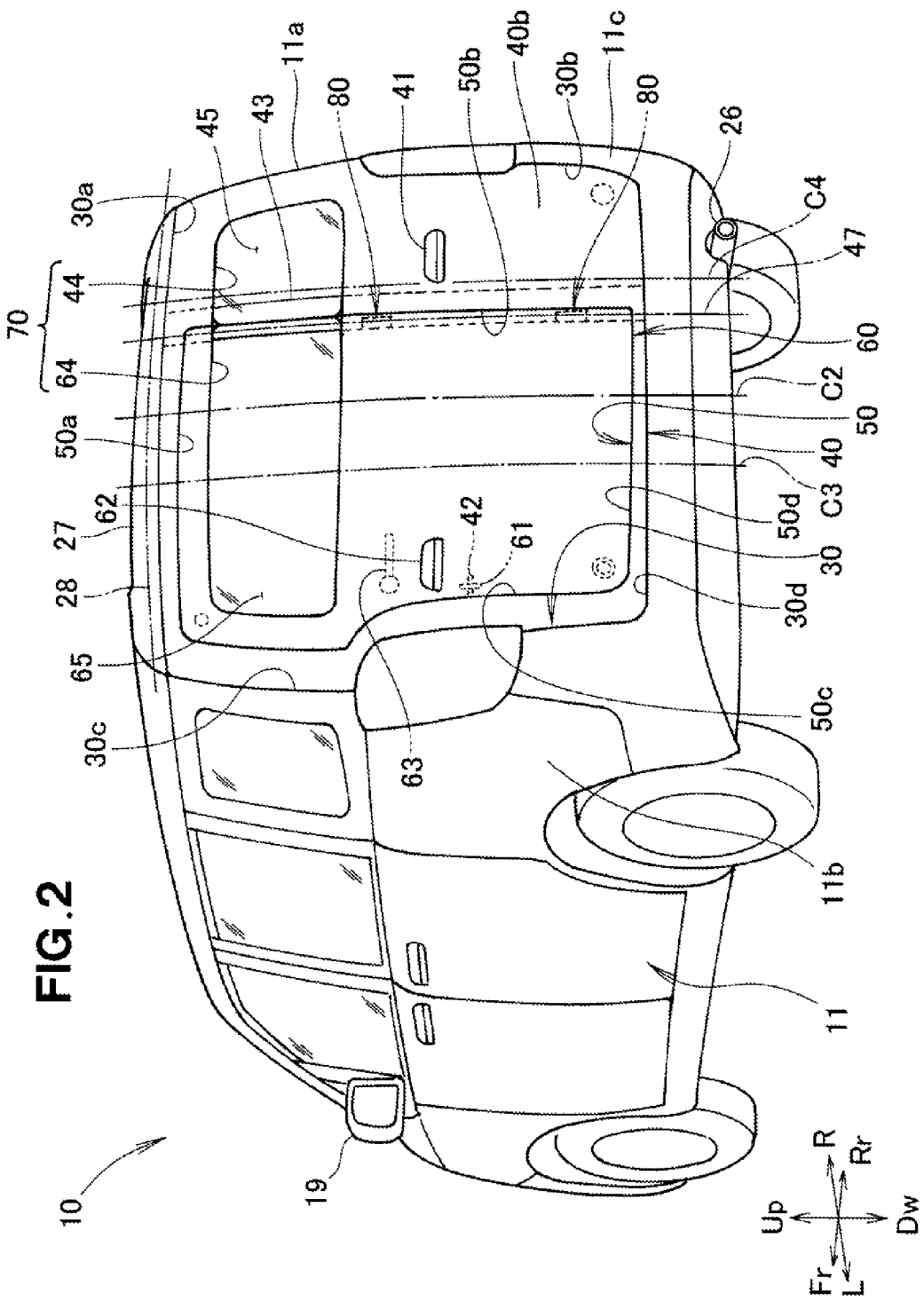
FIG. 2 is a perspective view of the vehicle illustrated in FIG. 1.
Figure 3:
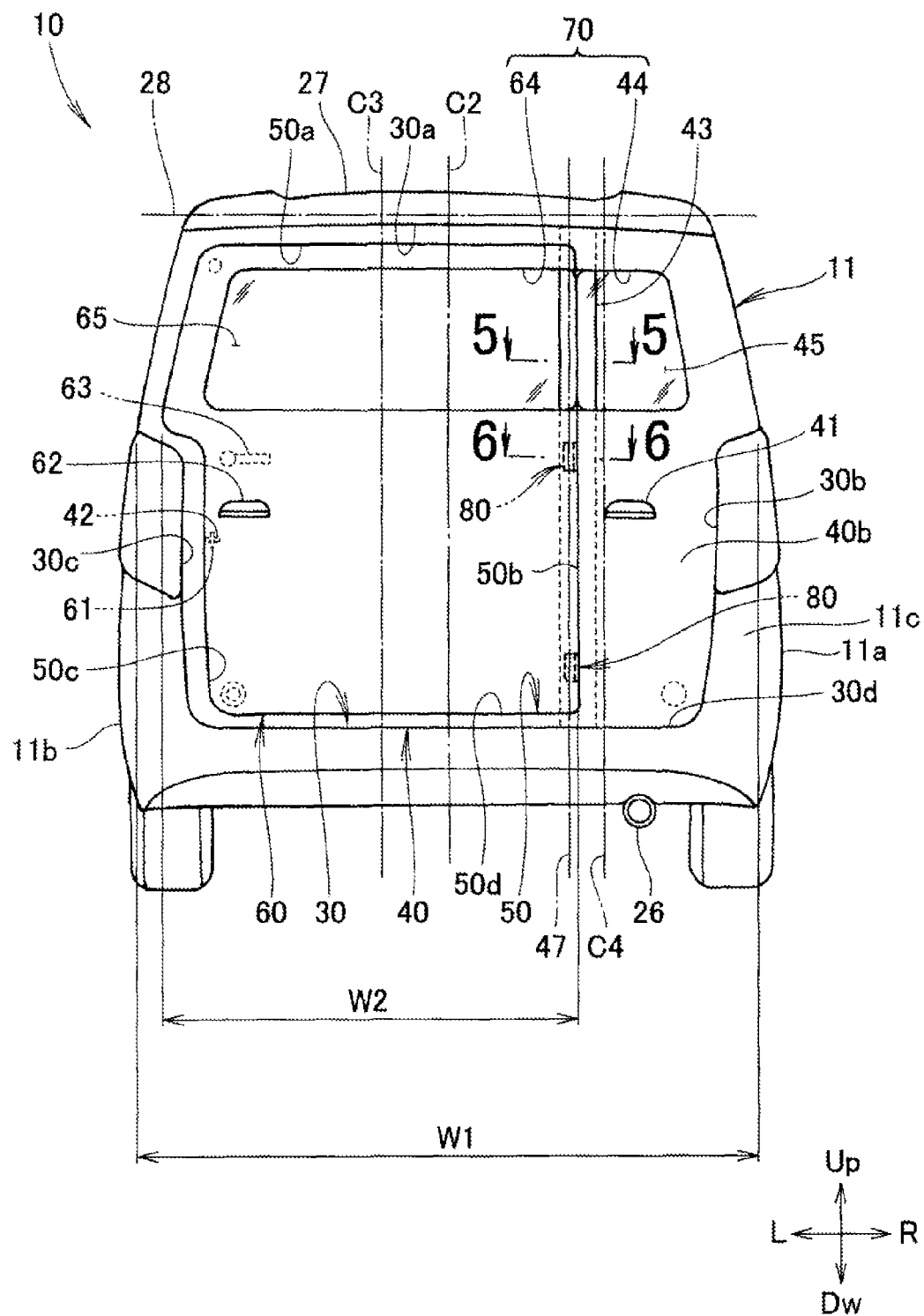
FIG. 3 is a rear view of the vehicle illustrated in FIG. 1.

As illustrated in FIGS. 2 through 4, a rear opening 30 is formed across the entire rear face of the vehicle 10 in the lateral direction and a top-bottom direction thereof. The tailgate 40 is attached so as to be capable of opening and closing the rear opening 30. The tailgate 40 constitutes the rear face of the vehicle when closed. A passenger opening 50 is formed across the entire height of the tailgate 40. The passenger opening 50 is an opening formed for a vehicle occupant to enter and exit, and is formed in a portion of the tailgate 40 in the lateral direction. A door 60 is attached to the passenger opening 50 so as to be able to open and close.

An exhaust port 26 faces to the rear of the vehicle 10. The exhaust port 26 discharges exhaust gas (emissions) generated in the engine (FIG. 1, reference symbol Eg) to the outside of the vehicle, and is a distal-end portion of an exhaust system component. The exhaust port 26 is offset to the driver's-seat side from the passenger opening 50. In other words, the exhaust port 26 is positioned closer to a right-end side of the vehicle body 11 than a center line C4 between the right end part of the vehicle body 11 and a lateral center line C2 of the vehicle body 11.

The rear opening 30 formed in the rear face of the vehicle 10 is substantially rectangular (including substantially square), and is formed from a top edge 30a formed in the lateral direction all along the vicinity of a roof 27 of the vehicle body 11, left and right side edges 30b, 30c (b being a subscript for the side edge on the right side, and c being a subscript for the side edge on the left side) leading downward from both ends of the top edge 30a along lateral end parts of the vehicle body, and a bottom edge 30d connecting bottom ends of the left and right side edges 30b, 30c.

The tailgate 40 is attached to a top part of the vehicle body 11 so as to be able to swing up and down about: a first opening/closing axis 28 extending horizontally. A tailgate knob 41 (opening operation means 41) capable of opening the tailgate 40 is provided on a vehicle-exterior face of the tailgate 40. Gripping the tailgate knob 41 allows the tailgate 40 to be swung in the top-bottom direction. When the tailgate 40 is closed, the tailgate 40 is held closed by a latch device. The latch device can be released by operating the tailgate knob 41.

The tailgate knob 41 is provided only on the vehicle-exterior face of the tailgate 40, and a tailgate knob 41 is not provided on a vehicle-interior face. This is to prevent the tailgate 40 attached along the entire lateral direction from being opened by mistake from inside the vehicle. A striker 42 for holding the door 60 closed is attached to a left-end part of the tailgate 40.

A pillar 43 is formed in the top-bottom direction in the vicinity of the passenger opening 50 provided in the tailgate 40. The pillar 43 is formed integrally with the tailgate 40. Formation of the pillar 43 in the tailgate 40 makes it possible to increase the rigidity of the vehicle 10 against external forces received from behind the vehicle 10.

Forming the passenger opening 50 across the tailgate 40 in the top-bottom direction makes the tailgate 40 weaker than when the passenger opening 50 is not provided. When the tailgate 40 has inadequate strength, elastic deformation can occur in locations at a peripheral edge of the passenger opening 50 due to vibrations from the road surface during vehicle travel. To overcome this problem, the pillar 43 is provided along a side edge of the passenger opening 50. Providing the pillar 43 across the passenger opening 50 along the side edge thereof in the top-bottom direction makes it possible to increase the strength of the tailgate 40 and suppress elastic deformation.

A tailgate window part 44 as an opening for checking outside the vehicle from the passenger compartment is formed in a. top part of the tailgate 40. The tailgate window part 44 is covered by a glass tailgate window panel 45. The tailgate window panel 45 covers the tailgate window part 44 and also covers a vehicle-exterior side of the pillar 43.

A rear-face remnant part 40b is formed in a location excluding the passenger opening 50 and excluding a vehicle-body rear part 11c forming a peripheral edge of the rear face. The exhaust port 26 is offset in the lateral direction from the passenger opening 50 and is positioned only in a location overlapping with the remnant part 40b. In a vehicle 10 in which the tailgate 40 is formed on the entire inner circumference of the vehicle-body rear part 11c, the remnant part 40b can be described as the region of the tailgate 40 not including the passenger opening 50.

The passenger opening 50 is substantially rectangular, and is formed from a top edge 50a formed along the top edge 30a of the rear opening 30, a side edge 50b extending from one end of the top edge 50a downward along the pillar 43, a side edge 50c extending from the other end of the top edge 50a downward along the side edge 30c of the rear opening 30, and a bottom edge 50d connecting bottom ends of the side edges 50b, 50c.

The center line C2 extending in the top-bottom direction at the lateral center is interposed between the side edges 50b, 50c of the passenger opening 50. Specifically, the left and right side edges 50b, 50c of the passenger opening 50 are offset in locations away from the lateral center. The width in the lateral direction of the passenger opening 50 formed in the tailgate 40 is less than the width of the rear opening 30, as shall be apparent. The center line C2 extending in the top-bottom direction is orthogonal to the first opening/closing axis 28. The left and right side edges 50b, 50c of the passenger opening 50 are positioned closer to the lateral center line C2 of the vehicle body 11 than to the center line C4 [between the center line C2] and the right end part.

A lateral center line C3 of the passenger opening 50 is offset to the left of the center line C2 extending in the top-bottom direction. Specifically, the lateral center line C3 of the passenger opening 50 is positioned so as to be offset toward the passenger-seat side relative to the center line C2

(lateral center line of the vehicle body 11) extending in the top-bottom direction at the lateral center.

The door 60 is supported by the pillar 43 via two hinges 80, and has a "sideways-opening" configuration. An axis extending in the vertical direction through the center of the two hinges 80 is referred to as a second opening/closing axis 47, and the door 60 swings about the second opening/closing axis 47. The door 60 swings horizontally and in the front-rear direction of the vehicle body 11.

A door latch 61 is attached to a left end part of the door 60. The door latch 61 engages with the striker 42 provided to the tailgate 40 and maintains closure of the door 60. The door latch 61 is configured so as to be releasable by operating an outer handle 62 swingably attached to a vehicle-exterior face of the door 60, or an inner handle 63 (releasing means 63) swingably attached to a vehicle-interior face of the door 60. Publicly known configurations may be used for the striker 42, the door latch 61, the outer handle 62, and the inner handle 63.

An operator unlocks [the door latch 61] by swinging the outer handle 62 or the inner handle 63, and swings the door 60. The door 60 swings toward the lateral center from the end part thereof on the passenger side. Specifically, the side edge 50c on the left side of the passenger opening 50 is the end opened first by the door 60.

The outer handle 62 and the inner handle 63 are both provided at an beginning end of the door 60 where the door 60 begins to open, and are superposed on each other in terms of the lateral direction. The operation for opening the door 60 can be performed from the vicinity of the beginning end whether from inside the vehicle or from outside the vehicle, and good efficiency of operation is obtained. The inner handle 63 is attached in a position higher than that of the outer handle 62.

A door window part 64 as an opening for checking outside the vehicle from the passenger compartment is formed in a top part of the door 60 so as to be continuous with the tailgate window part 44. The door window part 64 is covered by a glass door window panel 65.

The tailgate window part 44 and the door window part 64 have the same height (the length thereof in the top-bottom direction is the same), and are at the same position in the height direction. The tailgate window part 44 and the door window part 64 thereby form a single continuous body in the lateral direction. The tailgate window part 44 and the door window part 64 are referred to collectively as a "window part 70," as appropriate. The window part 70 is formed across the entire lateral direction. Due to this configuration, the window part 70 naturally is formed in at least a lateral center position. A pillar 43 is continuously formed from top to bottom between the tailgate window part 44 and the side edge 50b of the passenger opening 50 positioned in the vicinity of the tailgate window part 44.

In particular, the passenger opening 50 extends over half or more of the range of the tailgate 40, as illustrated in FIG. 3. More specifically, the width W2 of the passenger opening 50 is 70 percent of the width W1 of the tailgate 40; i.e., W2=0.7×W1.

Reserving half or more of the width of the rear opening 30 for the passenger opening 50 makes it possible to ensure adequate space for loading and unloading cargo or entering and exiting of people. The amount that the door 60 protrudes is reduced, and interference of objects around the vehicle 10 with the door 60 is thereby suppressed.

In particular, the window part 70 is formed in a position overlapping with a center plane CP, where the center plane CP is a plane extending in the front-rear direction of the vehicle body through the center line C2 extending up and down through the lateral center of the tailgate 40, as illustrated in FIG. 4.

As illustrated in FIGS. 1 and 3, the side edge 50c of the passenger opening 50 extending along a lateral end part is positioned on the opposite side from the driver's seat 12 with respect to the center line C1 extending in the front-rear direction of the vehicle body and the lateral center C2 extending in the top-bottom direction of the vehicle body. Meanwhile, the side edge 50b of the passenger opening 50 on the lateral-center side is positioned on the driver's seat 12 side of the center line C1 extending in the front-rear direction of the vehicle body and the lateral center C2 extending in the top-bottom direction of the vehicle body.

The pillar 43 and the second opening/closing axis 47 are provided in a position overlapping with the driver's seat 12 as viewed from behind the vehicle body 11. The second opening/closing axis 47 extends beside the side edge 50b of the passenger opening 50. The side edge 50b of the passenger opening 50 can be referred to as a side edge on the driver's seat 12 side.

Besides exhaust gas, water is also included as an emission discharged from the exhaust port 26. In a fuel cell vehicle, water generated in a fuel cell stack is discharged to the outside from the exhaust port 26. Specifically, the drivetrain for travel includes a fuel cell stack as an energy source for actuating a motor. In the present invention, the drivetrain for travel includes a motive power source for travel and an energy source for the same.

Besides glass, a resin panel or any other material that forms a transparent panel may be used for the door window panel 65. The door window panel 65 is referred to below as a "door window pane 65," as appropriate.

As illustrated in FIG. 1, the seat 23 is disposed adjacent to the rear face of the vehicle 10, and a right end thereof is positioned at a right end of the vehicle body 11. Specifically, a lateral one end 23a of the seat 23 is positioned at a lateral one end 11a of the vehicle body 11, and overlaps with a remnant part (indicated by the reference numeral 40b in FIG. 2). A lateral other end 23b of the seat 23 is a portion overlapping with the passenger opening 50 in the lateral direction, and is positioned closer than the lateral center line C3 of the passenger opening 50 to the one end 11a of the vehicle body 11.

Two headrests 29, 29 are provided to a top part of the seat 23. The headrest 29 disposed on the center line C1 extending in the front-rear direction at the lateral center overlaps with the passenger opening 50 in the front-rear direction.

The sub-seat 24 disposed continuously with the seat 23 extends from the lateral other end 23b of the seat 23 to a lateral other end 11b of the vehicle body 11.

The outer handle 62 is provided in a position away from the seat 23 in the lateral direction. As illustrated in FIG. 4 as well, the inner handle 63 overlapping with the outer handle 62 in the lateral direction is also attached in a position away from the seat 23.

The structure whereby the door 60 is attached will be described in detail using FIG. 5.

Figure 5:
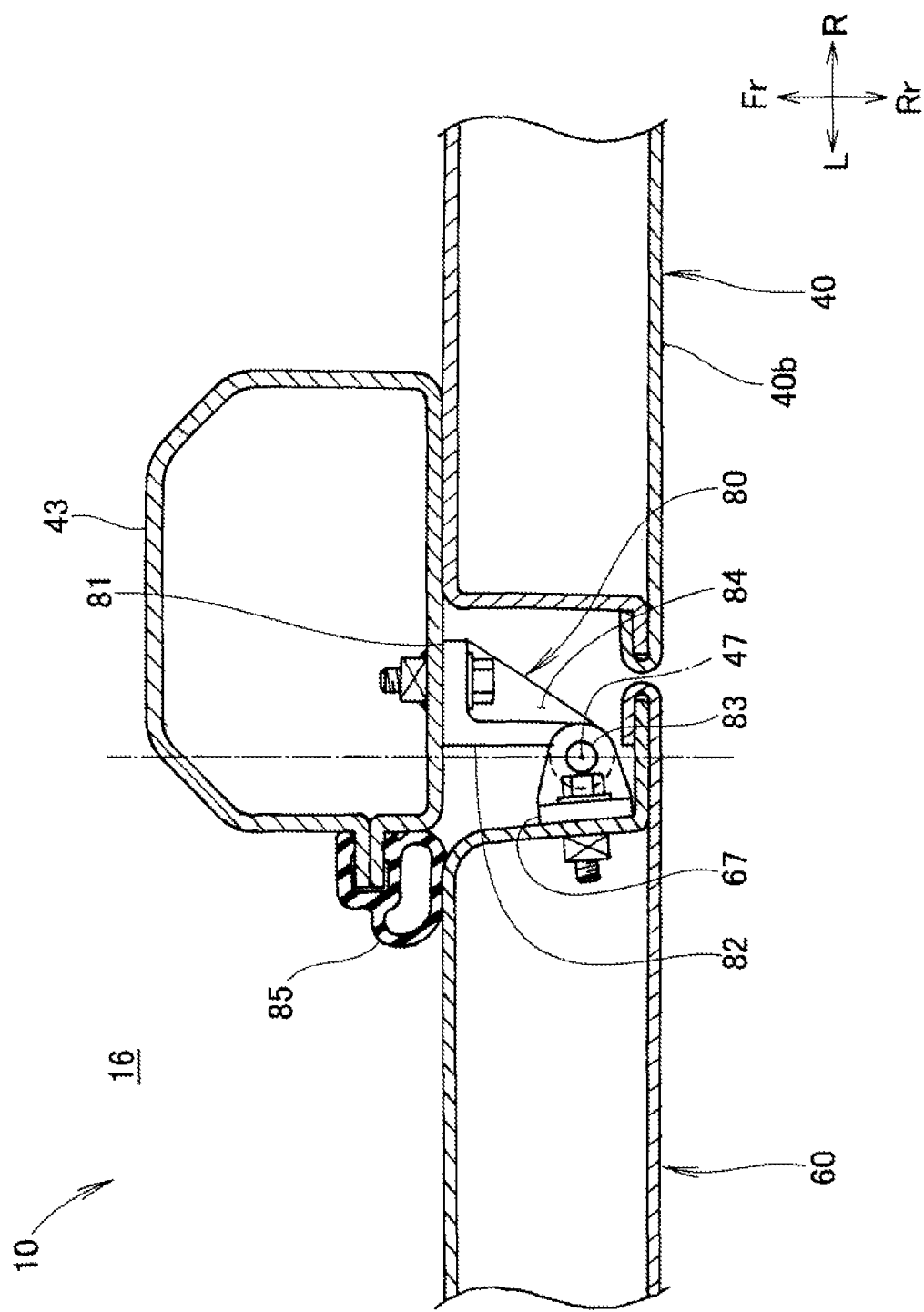
FIG. 5 is a sectional view taken along line 5-5 of FIG. 3.

As illustrated in FIG. 5, the door 60 is supported by the closed-section-shaped pillar 43 via the hinge 80. The hinge 80 and a seal member 85 for forming a seal between the door 60 and the inside of the passenger compartment are attached to the pillar 43. Configuring the pillar 43 as a closed section makes it possible to increase the rigidity of the pillar 43.

The hinge 80 is substantially L-shaped, and is composed of a base part 81 attached to the pillar 43, an arm part 82 extending toward the rear of the vehicle body from the base part 81, a pin 83 for swingably supporting the door 60, the pin 83 being attached to the distal end of the arm part 82, and a reinforcing part 84 spanning between the base part 81 and the arm part 82 for reinforcement thereof. An attached member 67 is fastened to the door 60, and the pin 83 passes through the attached member 67.

The door 60 is attached to the tailgate 40 so as to be able to swing in the front rear direction of the vehicle body about the hinge 80. The door 60 is swingably supported by the hinge 80, and it is therefore possible to simplify the structure for supporting the door 60.

The door 60 is also supported by the hinge 80 on the highly rigid pillar 43, thereby making it possible to increase the support rigidity of the door 60.

The tailgate window pane 45 and the door window pane 65 will be described in detail using FIG. 6.

Figure 6:
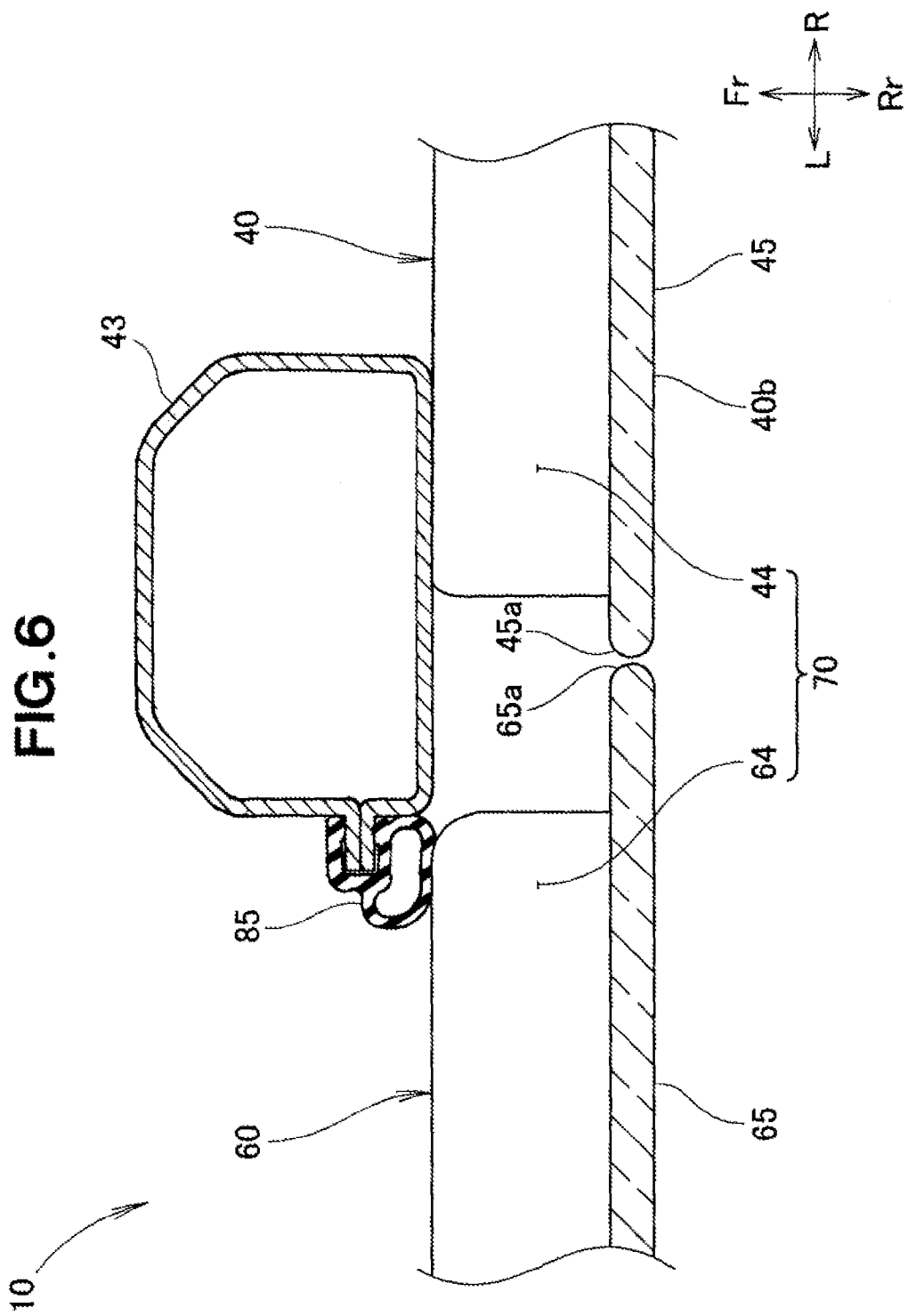
FIG. 6 is a sectional view taken along line 6-6 of FIG. 3.

As illustrated in FIG. 6, edges 45a, 65a of the window panes 45, 65 directly face each other. Through this configuration in which the edges 45a, 65a of the window panes 45, 65 directly face each other, the window panes 45, 65 appear integrated when viewed from behind the vehicle 10, and the design properties of the vehicle can be enhanced.

The edges 45a, 65a of the window panes 45, 65 also both arc shaped. The door window pane 65 swings together with the door 60. Configuring the edges 45a, 65a of the window panes 45, 65 so as to be arc shaped prevents the edges from interfering with each other during swinging. Preventing interference makes it possible for the edges 45a, 65a of the window panes 45, 65 to be placed closer together, and to further enhance the design properties.

The operation of the vehicle 10 will be described using FIGS. 7 and 8.

Figure 7:
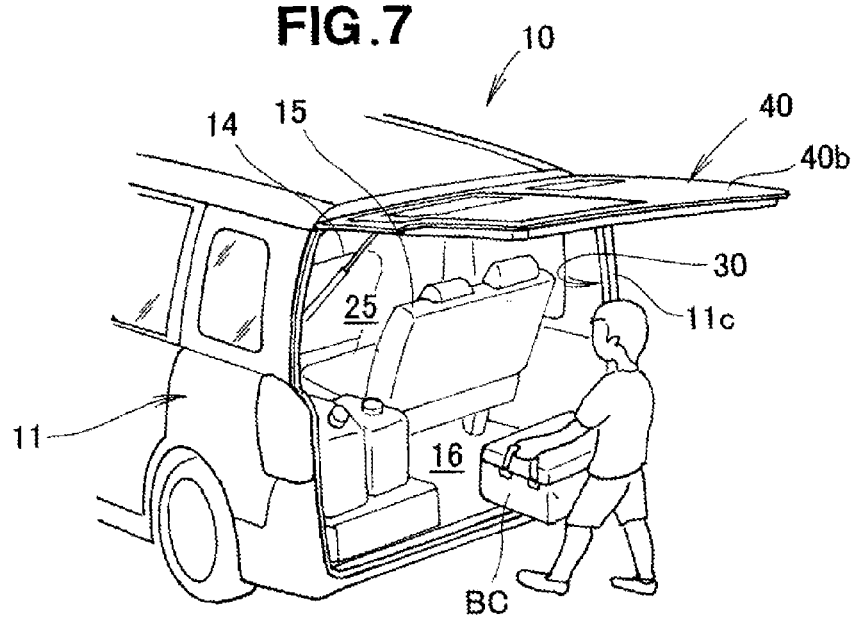
FIG. 7 is a view of an operation when a tailgate of FIG. 1 is open.

As illustrated in FIG. 7, when a large cargo item BC is loaded into the vehicle 10, the tailgate 40 is swung upward. Forming the rear opening 30 across the entire rear face of the vehicle 10 makes it possible to easily load large cargo.

Figure 8:
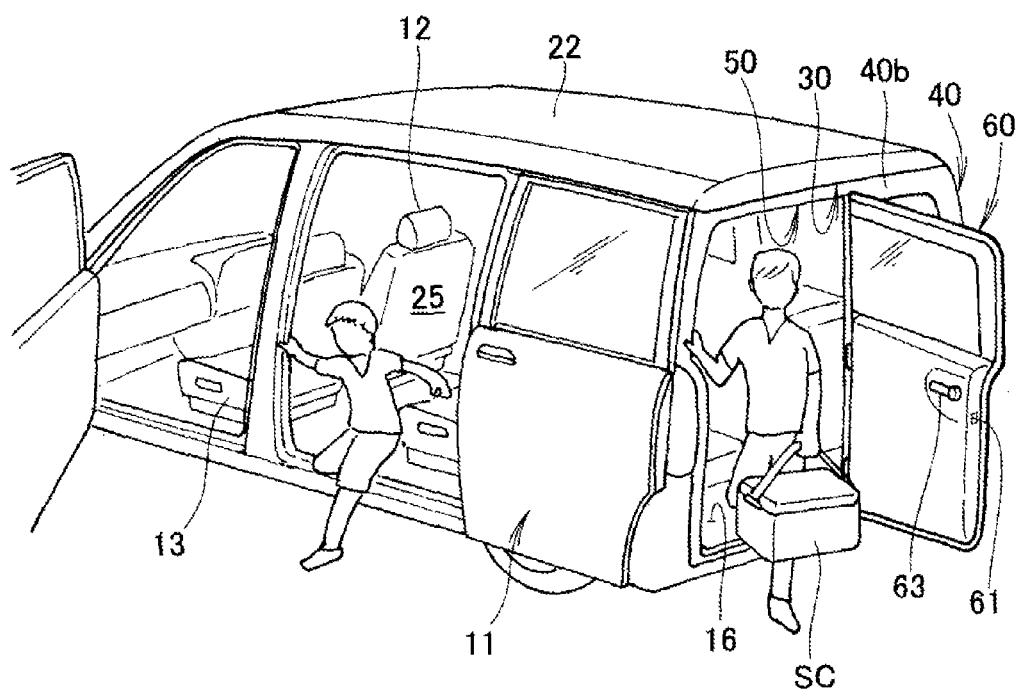
FIG. 8 is a view of an operation when a door of FIG. 1 is open.

As illustrated in FIG. 8, the rear opening 30 is formed across substantially the entire height range of the rear face of the vehicle 10, and the passenger opening 50 is formed across substantially the entire height range of the tailgate 40. People can enter and exit from the rear part of the vehicle 10 by using the passenger opening 50.

In particular, the inner handle 63 capable of releasing the door latch 61 is provided on the vehicle-interior face of the door 60. The door 60 can thereby be opened and closed by an operation from inside the vehicle, and a vehicle occupant can exit the vehicle from the rear part of the vehicle body 11. Specifically, a vehicle occupant can enter and exit from inside the vehicle as well, and ease of entry and exit is thereby increased.

When a small cargo item SC is loaded into the vehicle 10, the door 60 is swung horizontally. The door 60 begins to open from the side edge 50c at an end part in the lateral direction of the passenger opening 50. The door 60 is a portion of the tailgate 40, and is therefore lighter than the tailgate 40. [The door 60] is lighter than the tailgate 40 and is therefore easy to open and close, and has excellent operability.

Referencing FIG. 3 as well, the following statements can be made.

The passenger opening 50 is formed across substantially the entire range of the left half of the tailgate 40. When the door 60 is open, small cargo item SC is loaded from the passenger opening 50, and the hinges 80 for supporting the door 60 are attached in a region of the tailgate 40 in which the passenger opening 50 is not formed. Forming the passenger opening 50 in substantially the entire range of the left half of the tailgate 40 makes it possible to adequately ensure sufficient space to attach the hinges 80 for supporting the door 60, while ensuring the necessary opening area for loading small cargo item SC. The vehicle 10 having the passenger opening 50 such as described above also exhibits effects such as those described below with reference to the drawings.

As illustrated in FIG. 9(a), the exhaust port 26 is offset from the passenger opening 50 in the lateral direction. A vehicle occupant can thereby enter and exit while avoiding the exhaust port 26. Specifically, a vehicle occupant can enter and exit while avoiding exhaust gas, water, or other emissions. The vehicle 10 can be described as having high accessibility.

The exhaust port 26 and the lateral center line C3 of the passenger opening 50 are disposed so that the lateral center line C2 of the vehicle body 11 is interposed therebetween. The distance between the passenger opening 50 and the exhaust port 26 can thereby be increased. The exhaust port 26 can thus be separated from entering and exiting vehicle occupants.

Moreover, of the left and right side edges 50b, 50c of the passenger opening 50, the side edge 50c on the side of the lateral other end 11b of the vehicle body 11 is the beginning end where the door 60 begins to open. Specifically, the door 60 begins to open from the side edge 50c on a side farther from the seat 23. This configuration makes it possible for a vehicle occupant to enter and exit the vehicle 10 even when the door 60 is open a small amount. Conversely, when the beginning end is the side edge 50b on a side closer to the seat 23, the door 60 must be opened to a greater degree to prevent the seat 23 from obstructing entry and exiting. Accordingly, the door 60 is configured so as to begin to open from the side edge 50c on the side farther from the seat 23, thereby ensuring high accessibility.

Of the left and right side edges 50b, 50c of the passenger opening 50, the side edge 50c can also be referred to as the side edge 50c on the side farther from the exhaust port 26. Since the door 80 is opened from the side edge 50c on the side farther from the exhaust port 26, a vehicle occupant can enter and exit while further avoiding exhaust gas, water, or other emissions.

As illustrated also in FIG. 1, the outer handle 62 for opening and closing the door 60 is attached to the vehicle-exterior face of the door 60 in the vicinity of the side edge 50c at the beginning end. The outer handle 62 is positioned at the beginning end, and a vehicle occupant can therefore enter and exit the vehicle 10 without coming near the exhaust port 26 when the door 60 is opened from outside the vehicle 10.

Moreover, the inner handle 63 is provided so as to be positioned away from the seat 23 when the door 60 is closed. This configuration prevents the seat 23 from interfering during door release.

The inner handle 63 is also provided so as to be closer than the lateral center line C3 of the passenger opening 50 to the other end 11b when the door 60 is closed. The inner handle 63 is provided at the end where opening of the door 60 begins, and a vehicle occupant is therefore positioned at the end where opening begins when operating the inner handle 63, and can more smoothly enter and exit.

As illustrated in FIG. 9(b), the sub-seat 24 positioned beside the seat 23 is configured so as to be displaceable to enable passage beside the seat 23. Adopting such a configuration makes it possible for vehicle occupants to be seated after entry or exit and for a large number of vehicle occupants to board despite the vehicle 10 being configured so that vehicle occupants can enter and exit from the rear of the vehicle body 11.

Moreover, the lateral other end 23b of the seat 23 is positioned in a location overlapping with the passenger opening 50 in the lateral direction. This configuration makes it possible for a vehicle occupant entering or exiting from the passenger opening 50 to grip the seat 23 while entering or exiting. High accessibility can therefore be ensured.

In particular, the headrest 29 is positioned at the lateral center and overlaps with the passenger opening 50 in the lateral direction. The headrest 29 can be gripped by a tall vehicle occupant to board the vehicle, and is thus more useful.

Insofar as the seat 23 can be gripped by a vehicle occupant when boarding the vehicle, the seat 23 is preferably disposed adjacent to the passenger opening 50.

In particular, the sub-seat 24 is preferably structured so as to fold toward the lateral other end 11b of the vehicle body 11. A vehicle occupant can grip the folded sub-seat 24 when entering or exiting. This configuration further enhances accessibility. A "flip-up" structure can be cited as an example of a structure for folding the sub-seat 24.

Furthermore, the headrest 29 overlaps with the passenger opening 50. Accessibility for tall vehicle occupants can be increased and accessibility can be increased for more vehicle occupants by providing a portion grippable by a vehicle occupant during entry or exiting at a higher position.

The front seat 21 is provided in front of the seat 23, and the front sub-seat 22 is provided in front of the sub-seat 24. The front, sub-seat 22 is configured so as to be displaceable to enable passage beside the front seat 21. Adopting such a configuration makes it possible for a vehicle occupant who is or will be seated elsewhere than the seat 23 to also enter or exit from the passenger opening 50. A larger number of vehicle occupants can then enter or exit from the passenger opening 50.

Displacing both the sub-seat 24 and the front sub-seat 22 also makes it possible to load a surfboard or other long cargo item LC through the passenger opening 50.

As illustrated in FIG. 1 as well, the seat width of the seat 23 is greater than the seat width of the sub-seat 24. This configuration makes it possible for a larger number of vehicle occupants to be seated without deploying the sub-seat 24. When all vehicle occupants can be seated on the seat 23, there is no need to deploy the retracted sub-seat 24. Enlarging the seat 23 makes it possible to ensure that a large number of vehicle occupants can be seated on the seat 23 and to save the effort of deploying the sub-seat 24.

The lateral other end 23b of the seat 23 is positioned closer than the lateral center line C3 of the passenger opening 50 to the lateral one end 11a of the vehicle body 11. Specifically, the length over which the seat 23 overlaps with the passenger opening 50 is less than half the width of the passenger opening 50. Reducing the amount of overlap of the seat 23 makes it possible to ensure a wide passage for vehicle occupants. Accessibility to vehicle occupants is thereby further increased. Moreover, the seat 23 and the inner handle 63 can be adequately separated, and the seat 23 can therefore be more reliably prevented from interfering during operation of the inner handle 63.

The operation of the vehicle 10 during travel will be described using FIGS. 10 and 11.

As illustrated by comparative examples in FIGS. 10(a) and 11(a), when a pillar 143 extends in the lateral center, pillar 143 overlaps with the majority of another vehicle OC traveling behind. Due to this majority overlap, it is difficult for a vehicle occupant to see the other vehicle OC in a rear-view mirror 118. In particular, as the distance between the vehicle 110 and the other vehicle. OC traveling behind increases, there is a risk, of the other vehicle OC being completely overlapped by the pillar 143 and becoming invisible.

Regions indicated by slanting lines and interposed between lines extending from the rear-view mirror 118 as illustrated in FIG. 10(a) are regions which can be checked in the rear-view mirror 118. Specifically, the space between the regions indicated by slanted lines is a region visually obstructed by the pillar 143.

As illustrated by examples in FIGS. 10(b) and 11(b), the pillar 43 disposed on the right side (driver's seat side) of the vehicle body 11 blocks a portion of the field of view of the rear-view mirror 18. However, the pillar 43 is placed aside to the right, enabling the other vehicle OC traveling behind the vehicle 10 to be checked in the rear-view mirror 18.

As illustrated in FIG. 10(c), when the other vehicle OC is traveling in an outside lane relative to the driver's seat, the trailing vehicle OC can be checked in the side mirror 19. As illustrated in FIG. 10(d), the trailing vehicle OC can be adequately checked when the vehicle 10 is traveling in a curve as well.

Figure 12:
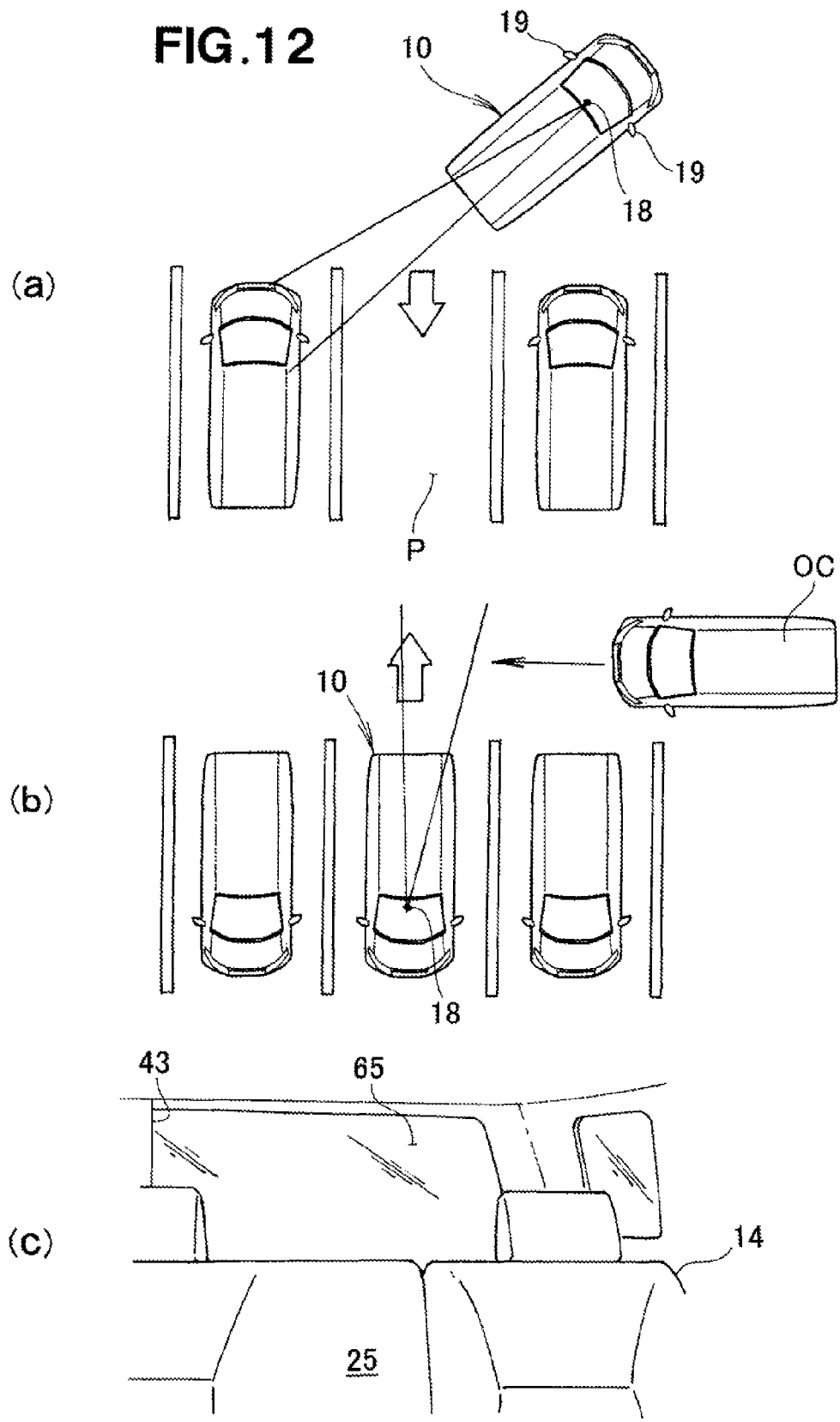
FIG. 12 is a view of the operation during parking of the vehicle illustrated in FIG. 1.

The operation of the vehicle when backing up will be described using FIG. 12.

The vehicle 10 is sometimes parked by backing up in a store parking lot P, as illustrated in FIG. 12(a), or the vehicle 10 is backed into a location where another vehicle OC is traveling from the side opposite the driver's seat, such as in a highway rest area, as illustrated in FIG. 12(b).

As illustrated in FIG. 12(c) as well, placing the pillar 43 in a location overlapping with the driver's seat makes it possible for the driver to have a wide field of view also when backing the vehicle 10.

Figure 10:
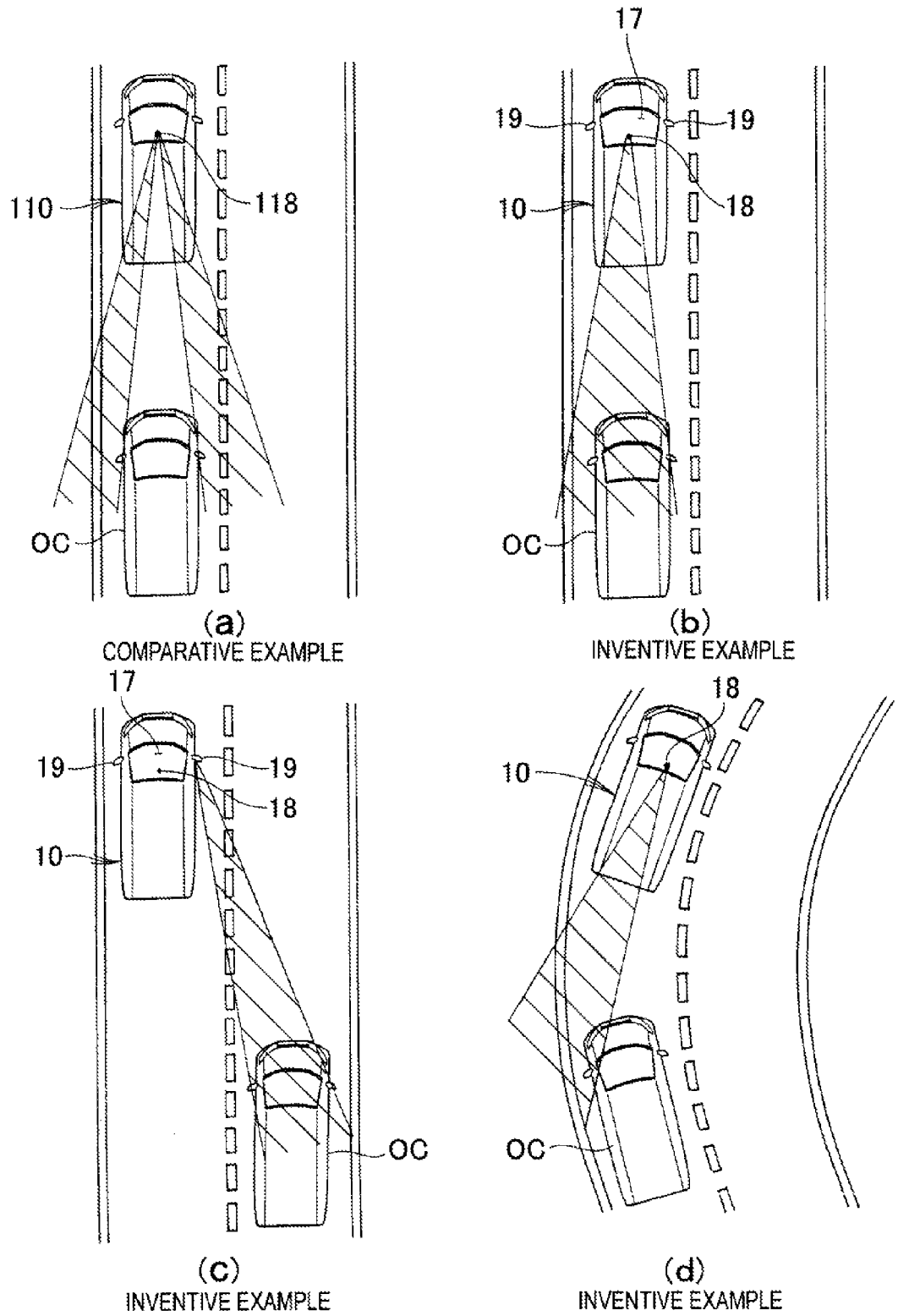
FIG. 10 is a view of an operation during travel of the vehicle of FIG. 1.

The following statements can be made with reference to FIG. 3 as well as to FIGS. 10 and 11 referenced above.

The side edges 50b, 50c of the passenger opening 50 are located away from the lateral center C2 of the vehicle body 11, and the window part 70 is provided at the lateral center position C2 of the tailgate 40. Providing the window part 70 in at least the center position C2 makes it possible to ensure a minimum field of view. Locating the side edges 50b, 50c of the passenger opening 50 away from the window part 70 prevents the side edges 50b, 50c of the passenger opening 50 from obstructing the field of view. Specifically, the vehicle 10 according to the present invention can he considered to be a vehicle in which high visibility can be ensured despite having the door 60 attached thereto.

The door window part 64 is also formed from one end of the door 60 to the other end thereof in the lateral direction, and the tailgate window part 44 is formed so as to span the region of the tailgate 40 in the lateral direction in which the door window part 64 is not formed. Specifically, the window part 70 is formed so as to span in the lateral direction. Forming the window part 70 in a wide range while preventing the side edges 50b, 50c of the passenger opening 50 from obstructing the field of view makes it possible to ensure higher visibility.

The tailgate window part 44 and the door window part 64 are also positioned at substantially the same height in relation to the tailgate 40. Specifically, the tailgate window part 44 and the door window part 64 are formed so as to be continuous. A field of view continuous in the height direction can therefore be obtained.

The following statements can also be made with reference to FIG. 1.

The driver's seat 12 is disposed in the vehicle body 11 so as to be offset with respect to the lateral center lines C1, C2, and the pillar 43 (second opening/closing axis 47) is attached in a position overlapping with the driver's seat 12 as viewed from behind the vehicle body 11 Specifically, the pillar 43 (second opening/closing axis 47) is provided in a position overlapping with the driver's seat 12. In the front-rear direction of the vehicle 10, the region overlapping with the driver's seat 12 is difficult for the driver Mn to see. Specifically, the pillar 43 (second opening/closing axis 47) is provided away from regions readily within the field of view of the driver Mn. Leaving locations readily within the field of view of the driver Mn clear makes it possible to ensure a good field of view for the driver Mn.

The side edge 50b of the passenger opening 50 on the lateral-center side is positioned on the driver's seat 12 side relative to the center lines C1, C2. Through this configuration in which the side edge 50b of the passenger opening 50 on the lateral-center side is positioned on the driver's seat 12 side, the boundary between the door window part 64 and the tailgate window part 44 is also positioned on the driver's seat 12 side. Positioning the boundary between the door window part 64 and the tailgate window part 44 in a location behind the driver's seat 12 and not readily visible to the driver Mn makes it possible to ensure a better field of view for the driver Mn.

The operation of the door 60 will be described using FIGS. 13 through. 15.

As illustrated in FIG. 13(a), in a vehicle 200 having only a tailgate 240, the tailgate 240 must always be open when loading cargo. When the tailgate 240 is opened, the tailgate 240 protrudes to the rear of the vehicle by an amount commensurate with the height of the tailgate 240.

Meanwhile, as illustrated in FIG. 13(b), the vehicle 10 according to the present embodiment has the door 60 attached in a portion of the tailgate. The door 60 is attached in a portion of the tailgate 40. When the door 60 is less wide than the tailgate is high, the amount of protrusion of the door 60 to the rear of the vehicle 10 can be reduced by a protrusion difference δ relative to a case in which the tailgate 40 is open. Suppressing the amount of protrusion to the rear of the vehicle 10 makes it possible to suppress interference of objects around the vehicle 10 with the opening and closing of the door 60. Specifically, loading of cargo requires only a small amount of space.

As illustrated in FIG. 14(a), in a vehicle 300 according to a comparative example, a door 360 opens and closes from a lateral center toward a lateral end part. Specifically, the door 360 opens from a side edge 350h on the lateral-center side. When placing a golf bag, baby stroller, or other long cargo item Ca in a cargo compartment 316 of such a vehicle 300, the cargo item Ca must be adequately inclined relative to the lateral direction so as not to come in contact with the door 360. Specifically, the inclination angle θ1 is large. However, when an attempt is made to place the cargo item Ca in at an angle, a distal end of the cargo item Ca may come in contact with a rear seat 315, and the cargo may be impossible to stow.

Meanwhile, as illustrated in FIG. 14(b), the door 60 of the vehicle 10 according to the present embodiment opens from the lateral end part toward the lateral center. The door 60 is opened toward the lateral center, and when stowing a long cargo item Ca, the cargo item Ca need only be inclined a small amount relative to the lateral direction. Specifically, the inclination angle θ2 can be small. Due to this small amount of inclination, the third-row seat does not interfere with stowing. The absence of interference by the third-row seat makes it possible to easily stow a long cargo item Ca.

As illustrated in FIG. 15(a), in the vehicle 300 according to a comparative example, the door 360 begins to open from the vicinity of an end part of a tailgate 340 on the driver's-seat side thereof. A door knob for opening the door 360 is attached in the vicinity of the location where the door 360 begins to open, i.e., at the end part on the driver's-seat side. A vehicle occupant opening the door 360 first moves from a passenger seat 313 to a rear corner of the vehicle 300. The vehicle occupant then moves from the rear corner to the rear right end of the vehicle 300 and opens the door 360.

Meanwhile, in the vehicle 10 according to the present embodiment as illustrated in FIG. 15(b), the door 60 begins to open from the vicinity of the end part in the lateral direction of the tailgate 40. A door knob (indicated by reference numeral 62 in FIG. 3) for opening the door (30 is attached in the vicinity of the location where the door 60 begins to open. A vehicle occupant opening the door 60 first moves from the passenger seat 13 to a rear corner of the vehicle 10. The rear corner of the vehicle 10 and the end part in the lateral direction of the tailgate 40 are close together, and the door knob for opening the door 60 is therefore also attached in the vicinity thereof. The vehicle occupant can therefore open the door 60 without moving behind the vehicle to the lateral center. By not moving behind the vehicle to the lateral center, the vehicle occupant can move a correspondingly smaller distance around the vehicle As illustrated in both FIGS. 1 and 3, the driver's seat 12 is offset to one side relative to the center lines C1, C2, and one side edge (indicated by reference numeral 50c in FIG. 4) of the passenger opening 50 is positioned on the opposite side from the driver's seat 12. Specifically, the side edge on the side of the passenger opening 50 where the door 60 begins to open is positioned on the passenger seat 13 side. When loading cargo near a roadway, the loading is preferably performed at a position distant from the roadway. Through the present invention, configuring the door 60 so as to begin opening from the end part thereof on the passenger seat 13 side makes it possible to easily load cargo at a position distant from the roadway.

Second Embodiment

A second embodiment of the present invention next be described with reference to the accompanying drawings.

Figure 16:
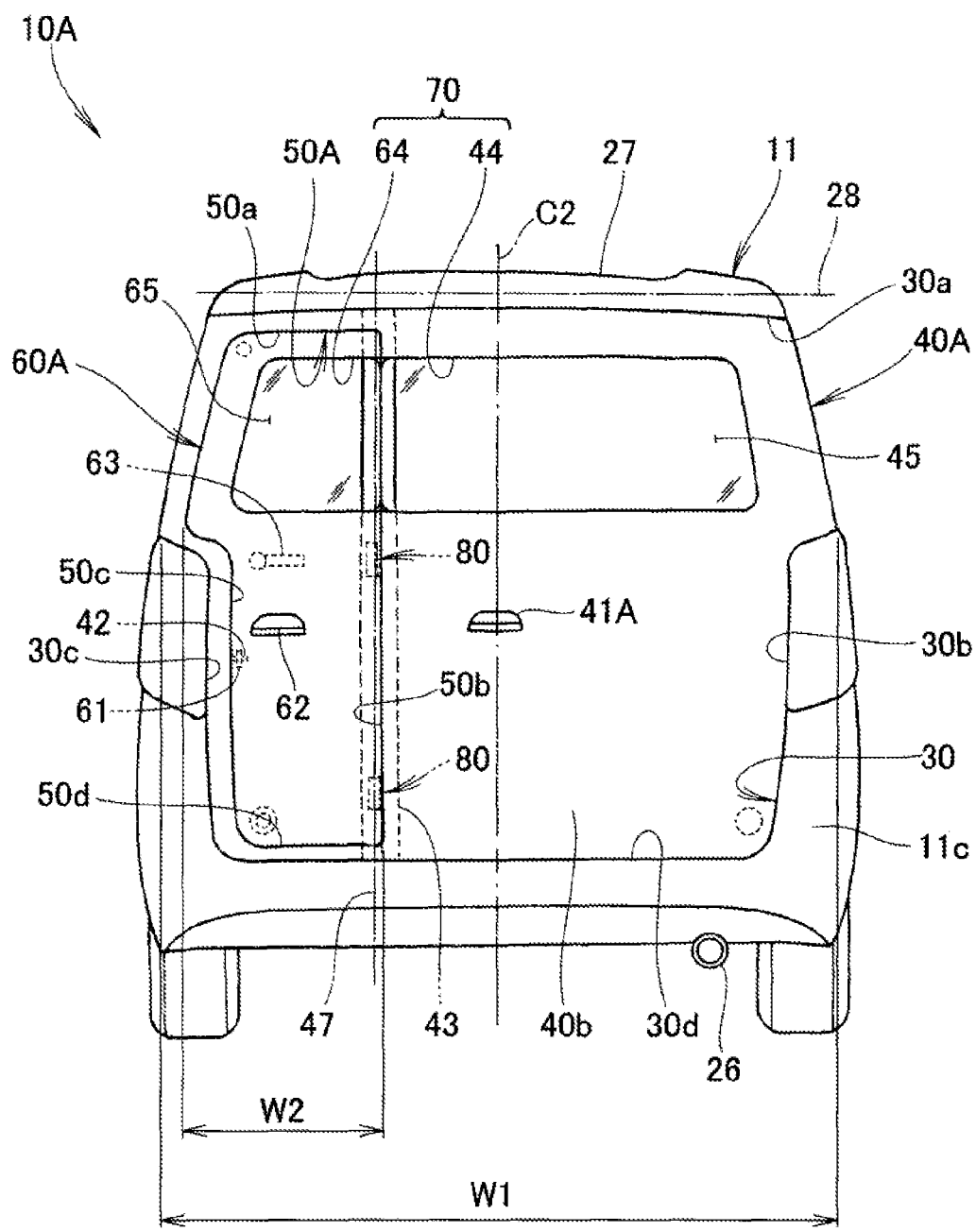
FIG. 16 is a rear view of the vehicle according to a second embodiment of the present invention.

FIG. 16 illustrates a vehicle according to a second embodiment, and corresponds to FIG. 3.

In a vehicle 10A as illustrated in FIG. 16, W2=0.3×W1, where W2 is the width of a door 60A, and W1 is the width of a tailgate 40A. A tailgate knob 41A (opening means 41) is positioned in a location away from the exhaust port 26 in the lateral direction. The effects specific to the present invention can also be obtained in the vehicle 10A according to the second embodiment configured such as described above.

Third Embodiment

A third embodiment of the present invention will next be described with reference to the accompanying drawings.

Figure 17:
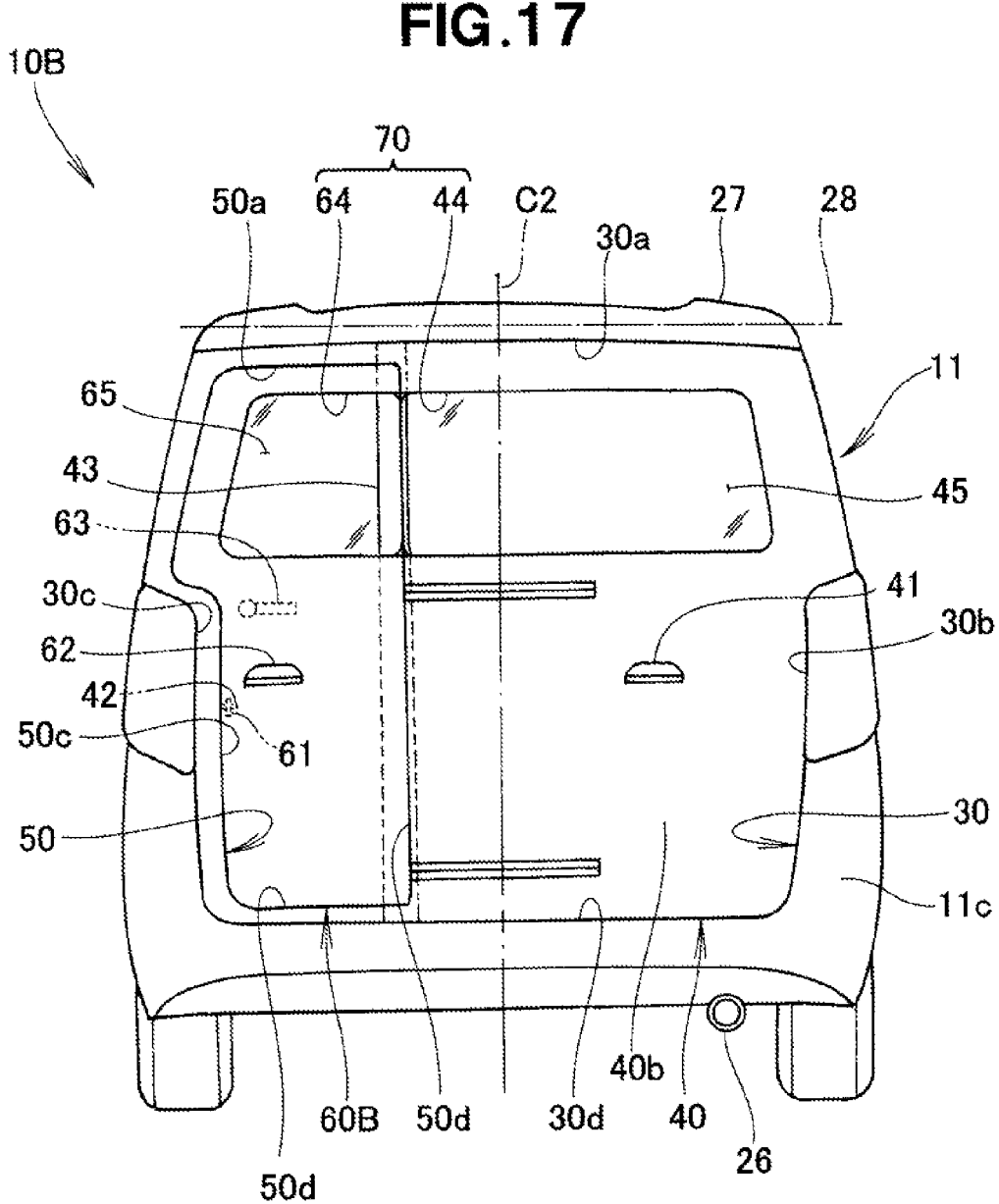
FIG. 17 is a rear view of the vehicle according to a third embodiment of the present invention.

FIG. 17 illustrates a vehicle according to a third embodiment, and corresponds to FIG. 3.

In a vehicle 10B as illustrated in FIG. 17, a door 60B is a sliding door for sliding in the lateral direction. The sliding door can also be considered to be a type of sideways-opening door.

The effects specific to the present invention can also be obtained in the vehicle 10B according to the third embodiment configured such as described above. Forming the door 60B as a sliding door makes it possible to further reduce the amount of protrusion thereof to the rear of the vehicle. The vehicle 10B according to the third embodiment does not have hinges (indicated, by reference numeral 80 in FIG. 4) or a second opening/closing axis (indicated by reference numeral 47 in FIG. 3).

Fourth Embodiment

A fourth embodiment of the present invention will next be described with reference to the accompanying drawings.

Figure 18:
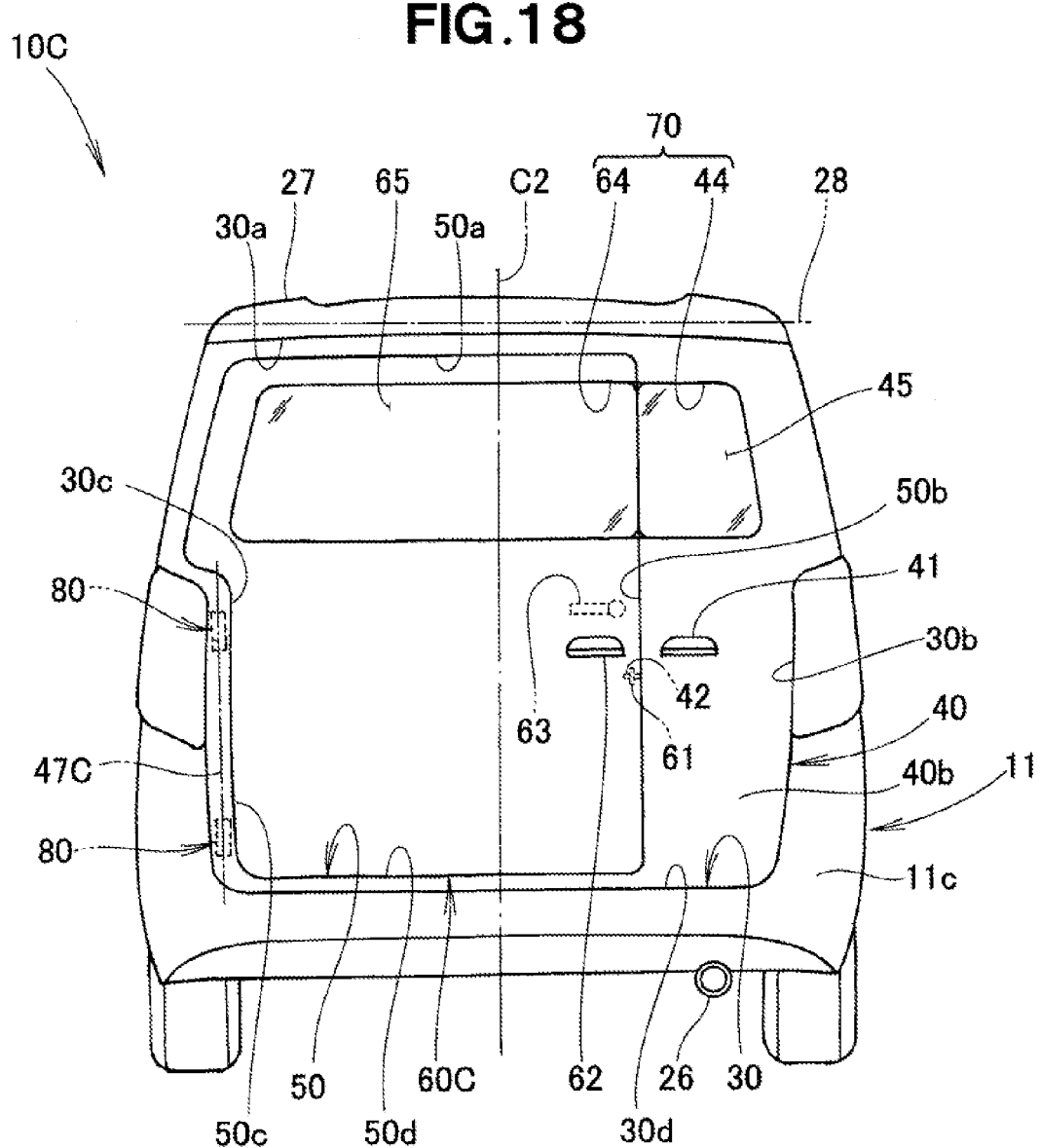
FIG. 18 is a rear view of the vehicle according to a fourth embodiment of the present invention.

FIG. 18 illustrates a vehicle according to a fourth embodiment, and corresponds to FIG. 3.

In a vehicle 10C as illustrated in FIG. 18, a door 60C opens from a lateral end part thereof. Specifically, a second opening/closing axis 47C is formed at a lateral end part. The effects specific to the present invention can also be obtained in the vehicle 10C according to the fourth embodiment configured such as described above. The vehicle 10C according to the fourth embodiment does not have a pillar (indicated by reference numeral 43 in FIG. 3).

Fifth Embodiment

A fifth embodiment of the present invention will next be described with reference to the accompanying drawings.

Figure 19:
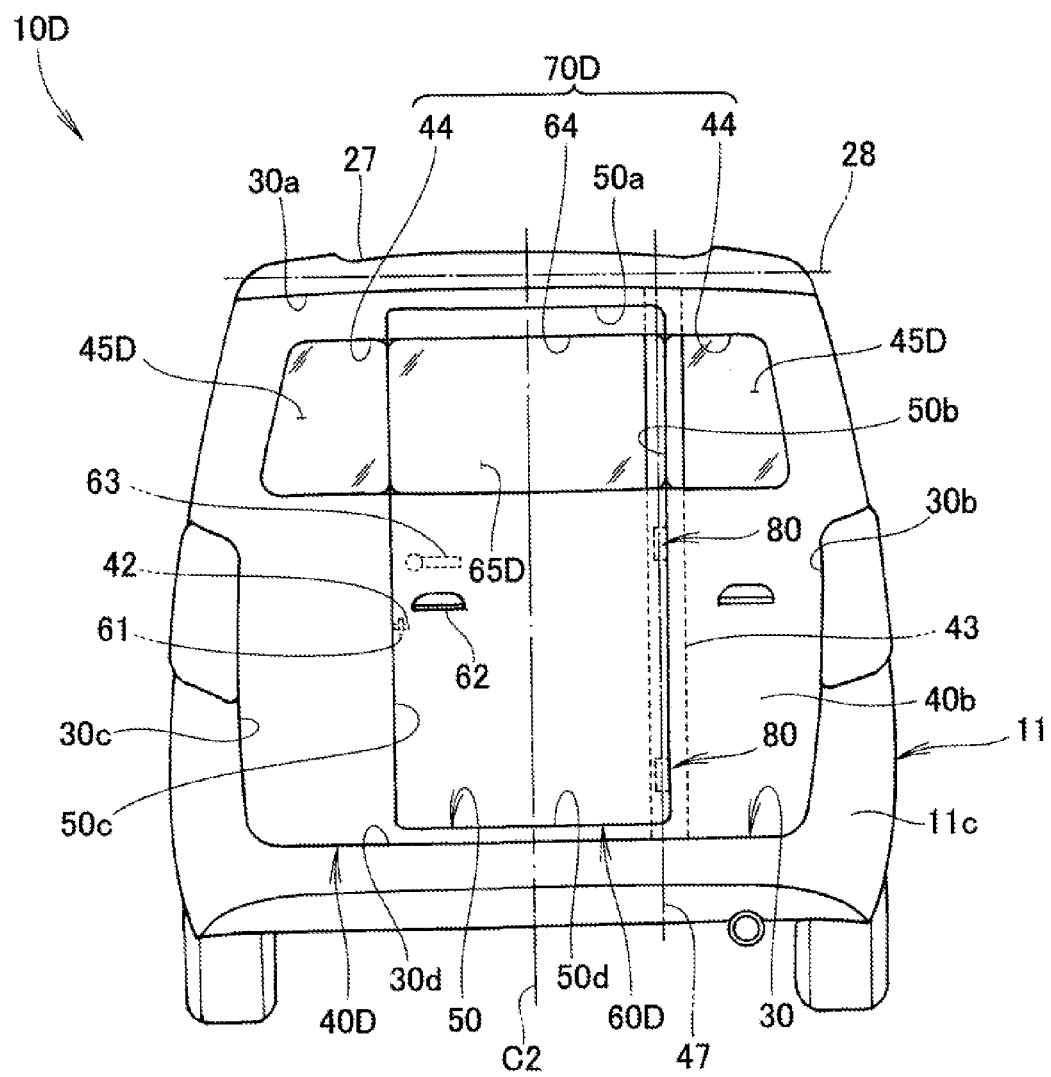
FIG. 19 is a rear view of the vehicle according to a fifth embodiment of the present invention.

FIG. 19 illustrates a vehicle according to a fifth embodiment, and corresponds to FIG. 3.

In a vehicle 10D as illustrated in FIG. 19, a door 60D is formed at the center of a tailgate 40D. Through this configuration, a door window pane 65D is disposed in the lateral center, and two tailgate window panes 45D, 45D are disposed so that the door window pane 65D is interposed therebetween. Specifically, a window part 70D is composed of the door window pane 65D and the two tailgate window panes 45D, 45D. The effects specific to the present invention can also be obtained in the vehicle 10D according to the fifth embodiment configured such as described above.

Sixth Embodiment

A sixth embodiment of the present invention will next be described with reference to the accompanying drawings.

Figure 20:
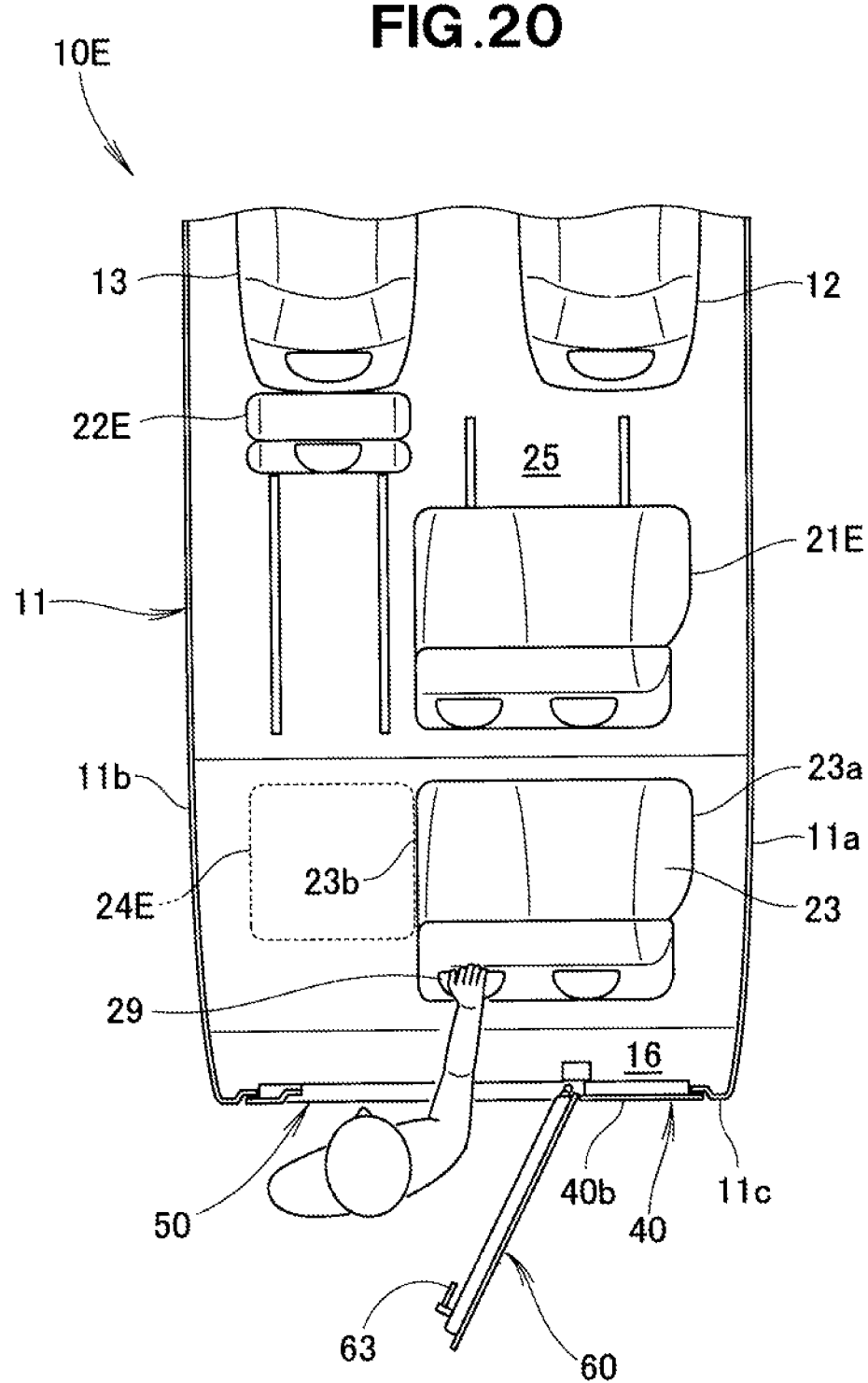
FIG. 20 is a perspective view illustrating the vehicle according to a sixth embodiment of the present invention from above.

FIG. 20 illustrates a vehicle according to a sixth embodiment, and corresponds to FIG. 9(b).

In a vehicle 10E as illustrated in FIG. 20, a sub-seat 24E is configured so as to be stowable in a floor of a passenger compartment, and a front sub-seat 22E is configured so as to be capable of moving forward and folding The effects specific to the present invention can also be obtained in the vehicle 10E according to the sixth embodiment configured such as described above.

Any combination of seats structured so as to fold in the lateral direction, seats structured so as to fold in the front-rear direction, and seats structured so as to be stowable in the floor may be used insofar as the effects of the present invention can be obtained.

The vehicle according to the present invention is described above using a right-hand-drive vehicle as an example, but the present invention is also applicable to a left-hand-drive vehicle. In this case, a passenger opening and a door may be provided in substantially the right half of the rear part of the vehicle, and the door thereby configured so as to open from the end part on the opposite side from the driver's seat, or the configuration may be otherwise changed as appropriate. The modes described above do not limit the present invention.

Specifically, the embodiments described above are described in order to facilitate understanding of the present invention. The present invention is not limited to the modes described in the embodiments in demonstrating the operations/effects of the present invention. Each embodiment may also be combined with different embodiments as appropriate.

INDUSTRIAL APPLICABILITY

The vehicle of the present invention is suitable as a van-type vehicle.

REFERENCE SIGNS LIST 10, 10A, 1013, 10C, 10D, 10E vehicle
11 vehicle body
11a lateral one end of vehicle body
11b lateral other end of vehicle body
21 main seat (front seat)
22, 22E sub-seat (front sub-seat)
23 main seat (seat)
23a lateral one end of seat
23b lateral other end of seat
24, 24E sub-seat
25 passenger compartment
29 headrest
30 rear opening
40, 40A tailgate
40b remnant part
50, 50A passenger opening
50b side edge of passenger opening
50c side edge (beginning end) of passenger opening
60, 60A, 60B, 600, 60D door
C2 center line extending in the top-bottom direction at the lateral center lateral center line of vehicle body)
C3 lateral center line of passenger opening

The invention claimed is:

1. A vehicle comprising:
a rear opening formed across an entire rear face in a lateral direction;
a tailgate attached to a vehicle body for opening and closing the rear opening;
a passenger opening whereby a vehicle occupant can enter and exit, formed in the tailgate;
a sideways-opening door configured to open and close the passenger opening; and
a seat provided adjacent to the rear face,
wherein the passenger opening is formed in a portion of the rear face in the lateral direction,
wherein the seat has a first end at a side of one end of the vehicle in the lateral direction, and a second end at a side of the other end of the vehicle in the lateral direction,
wherein a space through which a passenger can pass is formed between the second end of the seat and the other end of the vehicle,
wherein the passenger opening has a first side edge at the side of the one end of the vehicle, and a second side edge at the side of the other end of the vehicle,
wherein the second side edge of the passenger opening is more separated from a lateral center line of the vehicle in the lateral direction than the first side edge of the passenger opening,
wherein the second side edge of the passenger opening is a beginning end at which opening by the door begins, and
wherein the second edge of the seat and the space are positioned at a location overlapping with the passenger opening in the lateral direction.

2. The vehicle according to claim 1, wherein the second end of the seat is positioned closer than a lateral center line of the passenger opening to the one end of the vehicle body.

3. The vehicle according to claim 1, wherein a headrest is provided to a top part of the seat, and the headrest overlaps with the passenger opening as viewed from a back face of the vehicle body.

4. The vehicle according to claim 1, wherein the first and second edges of the passenger opening are offset in the lateral direction from the lateral center line of the vehicle body.

5. The vehicle according to claim 1, wherein a sub-seat is provided extending from the second end of the seat to the other end of the vehicle body, and the sub-seat is configured so as to be displaceable to form the space.

6. The vehicle according to claim 5, wherein a seat width of the seat is greater than a seat width of the sub-seat.

7. The vehicle according to claim 6, wherein the sub-seat is displaceable toward the other end of the vehicle body through use of a folding structure.

8. The vehicle according to claim 5, wherein a front seat is provided in front of the seat and a front sub-seat is provided in front of the sub-seat as viewed from the back face of the vehicle body, and the front sub-seat is configured so as to be displaceable to enable passage beside the seat.

9. The vehicle according to claim 1, wherein the sideway-opening door is configured to pivotably open and close the passenger opening or to slidably open and close the passenger opening.

10. A vehicle comprising:
a passenger opening formed in a rear face;
a sideways-opening door configured to open and close the passenger opening; and
a seat provided adjacent to the rear face,
wherein the passenger opening is formed in a portion of the rear face in the lateral direction,
wherein the seat has a first end at a side of one end of the vehicle in the lateral direction, and a second end at a side of the other end of the vehicle in the lateral direction,
wherein a space through which a passenger can pass is formed between the second end of the seat and the other end of the vehicle,
wherein the passenger opening has a first side edge at the side of the one end of the vehicle, and a second side edge at the side of the other end of the vehicle,
wherein a remnant part of the rear face is formed between the first side edge of the passenger opening and the one end of the vehicle,
wherein at least a portion of the seat overlaps with the remnant part in the lateral direction,
wherein the second side edge of the passenger opening is more separated from a lateral center line of the vehicle in the lateral direction than the first side edge of the passenger opening,
wherein the second side edge of the passenger opening is a beginning end at which opening by the door begins, and
wherein the second edge of the seat and the space are positioned at a location overlapping with the passenger opening in the lateral direction.

11. The vehicle according to claim 10, wherein the sideway-opening door is configured to pivotably open and close the passenger opening or to slidably open and close the passenger opening.

* * * * *